(12) United States Patent
Koga

(10) Patent No.: US 12,180,685 B2
(45) Date of Patent: Dec. 31, 2024

(54) SHOVEL, SHOVEL MANAGEMENT DEVICE, SHOVEL MANAGEMENT SYSTEM, SHOVEL SUPPORTING DEVICE

(71) Applicant: SUMITOMO HEAVY INDUSTRIES, LTD., Tokyo (JP)

(72) Inventor: Masato Koga, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 374 days.

(21) Appl. No.: 17/655,052

(22) Filed: Mar. 16, 2022

(65) Prior Publication Data

US 2022/0205221 A1 Jun. 30, 2022

Related U.S. Application Data

(63) Continuation of application No. PCT/JP2020/035364, filed on Sep. 17, 2020.

(30) Foreign Application Priority Data

Sep. 19, 2019 (JP) .................................. 2019-170763

(51) Int. Cl.
E02F 9/26 (2006.01)
E02F 9/24 (2006.01)
(Continued)

(52) U.S. Cl.
CPC .................. *E02F 9/26* (2013.01); *E02F 9/24* (2013.01); *E02F 9/261* (2013.01); *H04L 67/12* (2013.01);
(Continued)

(58) Field of Classification Search
CPC ..... B62D 33/0617; A01B 69/008; A01B 3/02; A01B 35/02; A01B 71/00; A01B 76/00; A01B 15/06; A01B 49/022; A01B 49/06; A01B 49/065; A01B 69/00; B60R 21/00; B60R 1/00; B60R 2300/8033; E02F 9/261; E02F 3/435; E02F 9/2004; E02F 9/2033;
(Continued)

(56) References Cited

U.S. PATENT DOCUMENTS

| 10,753,067 B2 * | 8/2020 | Okada ................... B60W 30/09 |
| 2014/0195184 A1 | 7/2014 | Maeda et al. |
| 2018/0209122 A1 | 7/2018 | Kiyota et al. |

FOREIGN PATENT DOCUMENTS

| JP | H01-135946 | 5/1989 |
| JP | H08-049262 | 2/1996 |

(Continued)

OTHER PUBLICATIONS

JP 2011-095531 English translation (Year: 2024).*
(Continued)

*Primary Examiner* — Jelani A Smith
*Assistant Examiner* — Paul A Castro
(74) *Attorney, Agent, or Firm* — IPUSA, PLLC

(57) ABSTRACT

A shovel includes a data acquisition device and a storage. The data acquisition device acquires operation information indicating a status of each part of the shovel during operation of the shovel and sound data during operation of the shovel, from a state detecting sensor, and wherein the storage stores the operation information in association with the sound data.

8 Claims, 11 Drawing Sheets

(51) Int. Cl.
  *H04L 67/12* (2022.01)
  *E02F 3/32* (2006.01)
  *E02F 9/22* (2006.01)
(52) U.S. Cl.
  CPC ............... *E02F 3/32* (2013.01); *E02F 9/2221* (2013.01); *E02F 9/2285* (2013.01); *E02F 9/2292* (2013.01); *E02F 9/2296* (2013.01)

(58) Field of Classification Search
  CPC ..... E02F 9/24; E02F 9/262; E02F 3/32; E02F 9/26; E02F 9/2221; E02F 9/2285; E02F 9/2292; E02F 9/2296; E02F 9/267; E02F 9/20; E02F 3/30; E02F 3/43; E02F 3/437; E02F 9/205; E02F 9/2054; E02F 9/264; E02F 9/265; G08B 5/36; G08B 6/00; G08B 21/02; H04L 67/12; H04N 7/181
  See application file for complete search history.

(56) References Cited

FOREIGN PATENT DOCUMENTS

| | | | |
|---|---|---|---|
| JP | H08-144312 | | 6/1996 |
| JP | H09-049253 | | 2/1997 |
| JP | 2011-095531 | | 5/2011 |
| JP | 2011095531 A | * | 5/2011 |
| JP | 2013-041448 | | 2/2013 |
| JP | 2013-047427 | | 3/2013 |
| JP | 2015-063864 | | 4/2015 |
| JP | 2015063864 A | * | 4/2015 |
| JP | 2015-192163 | | 11/2015 |
| JP | 2018-197491 | | 12/2018 |

OTHER PUBLICATIONS

JP 2015069864 English translation (Year: 2024).*
International Search Report for PCT/JP2020/035364 mailed on Dec. 8, 2020.

* cited by examiner

SHOVEL, SHOVEL MANAGEMENT DEVICE, SHOVEL MANAGEMENT SYSTEM, SHOVEL SUPPORTING DEVICE

CROSS-REFERENCE TO RELATED APPLICATIONS

This U.S. non-provisional application is a continuation of PCT International Application PCT/JP2020/035364 filed on Sep. 17, 2020 and designated the U.S., which is based on and claims priority to Japanese Patent Applications No. 2019-170763, filed Sep. 19, 2019, with the Japan Patent Office. The entire contents of these applications are incorporated herein by reference.

BACKGROUND OF THE INVENTION

1. Field of the Invention

The present invention relates to a shovel, a shovel management device, a shovel management system, and a shovel supporting device.

2. Description of the Related Art

Conventionally, a shovel in which an operator performs a predetermined operation in accordance with an instruction of a predetermined operation displayed on a display in a cabin and stores a detected value from a sensor during the execution of the predetermined operation by the operator in a storage unit in association with the predetermined operation is known. The detected value from the sensor associated with the predetermined operation is transmitted to the management device, for example, and is used for the diagnosis of the failure of the shovel.

SUMMARY OF THE INVENTION

Problem to be Solved by the Invention

The operator of a shovel may detect a change in the shovel, by the sound during operation. However, in the prior art described above, recording the sound during operation of the shovel is not considered, and it is not possible to associate the sound during operation of the shovel with the operation of the shovel. Accordingly, it has been difficult in the prior art to share information on sound during operation of the shovel between the operator of the shovel and a service person who performs maintenance.

Therefore, in light of the above circumstances, the purpose of the invention is to share information on the sound during the operation of the shovel.

A shovel according to an embodiment of the present invention includes a data acquisition device acquiring operation information representing a state of each part in operation and acquiring sound data in operation from a state detecting sensor, and a storage storing the operation information in association with the sound data.

A management device of the shovel according to an embodiment of the present invention includes a receiving device (part) receiving operation information representing the status of each part of the shovel during operation and receiving sound data during operation from the shovel, in which the operation information and the sound data obtained from the state detecting sensor of the shovel, and a storage storing the operation information in association with the sound data.

A management system of the shovel according to an embodiment of the present invention is a management system of the shovel including a shovel and a management device of the shovel, wherein the shovel includes a data acquisition device that acquires operation information representing a state of each part in operation and sound data in operation from a state detecting sensor, and the management device includes a storage that stores the operation information received from the shovel in association with the sound data in operation.

A supporting device according to an embodiment of the present invention receives operation information indicating a status of each part of a shovel during operation and sound data during operation obtained by the shovel state detecting sensor and displays the operation information in association with the waveform indicated by the sound data in the display.

Information regarding the sound during shovel operation can be shared.

DETAILED DESCRIPTION OF THE INVENTION

Figure 1:
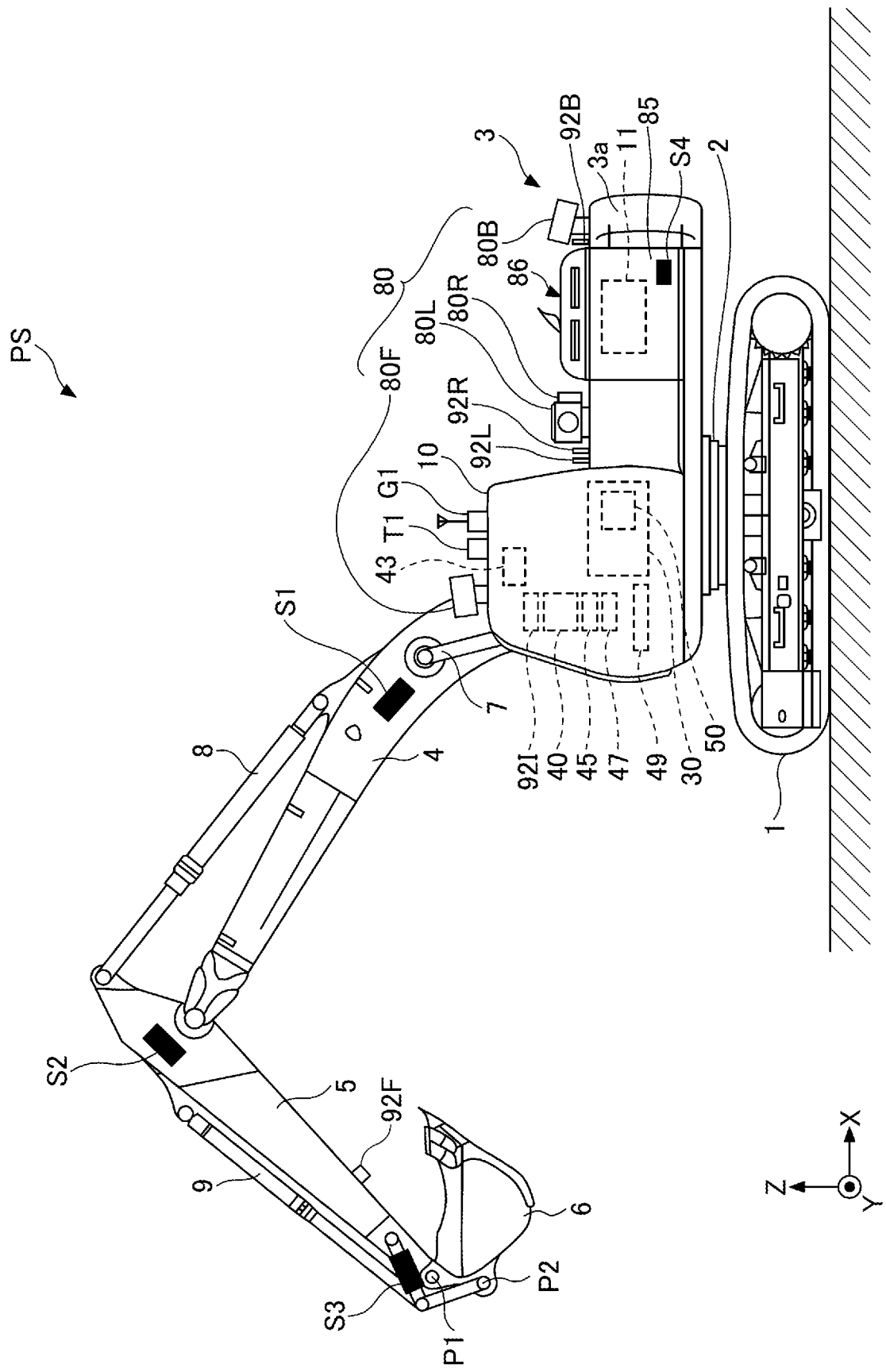
FIG. 1 is a side view of a shovel according to an embodiment of the present invention.
Figure 2:
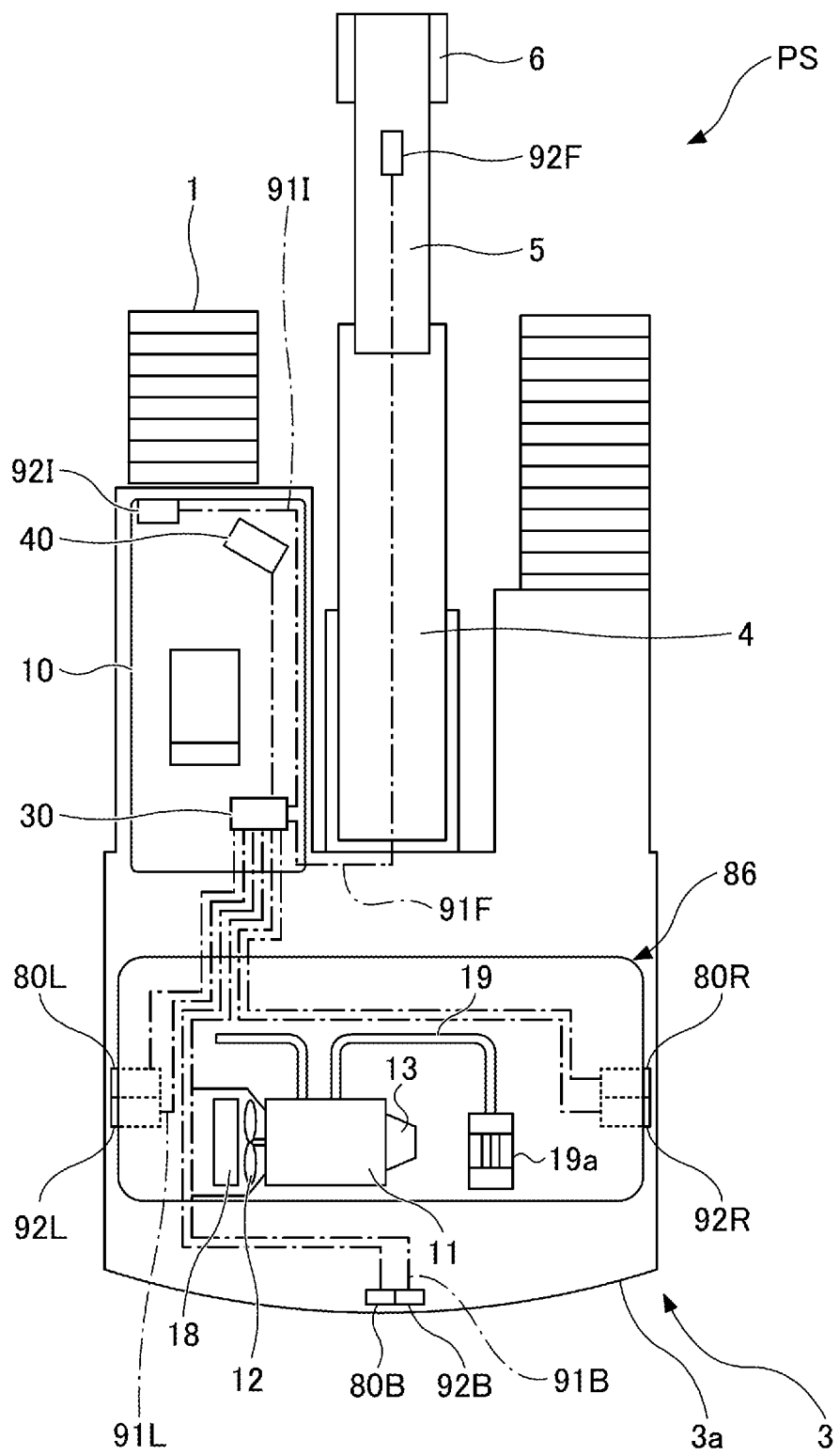
FIG. 2 is a top view of the shovel.

First, the overall configuration of the shovel PS of the present embodiment will be described with reference to FIGS. 1 and 2. FIG. 1 is a side view of a shovel. FIG. 2 is a top view of the shovel.

The lower traveling body 1 of the shovel PS is mounted with an upper traveling body 3 that can rotate through the turning equipment 2. A boom 4 is attached to the upper traveling body 3. An arm 5 is attached to the tip end of the boom 4. A bucket 6 is attached to the tip end of the arm 5 as an end attachment (work part) by an arm top pin P1 and a bucket link pin P2. The end attachments may include slope buckets, dredging buckets, breakers, and the like.

The boom 4, arm 5, and bucket 6 constitute an excavation attachment as an example of an attachment and are hydraulically driven by a boom cylinder 7, arm cylinder 8, and bucket cylinder 9, respectively. A boom angle sensor S1 is mounted on the boom 4, an arm angle sensor S2 is mounted on the arm 5, and a bucket angle sensor S3 is mounted on the bucket 6. The excavation attachment may be provided with bucket tilt equipment. The boom angle sensor S1, arm angle sensor S2, and bucket angle sensor S3 are sometimes referred to as "attitude sensors."

In the embodiment of FIG. 1, the boom angle sensor S1, the arm angle sensor S2, and the bucket angle sensor S3 each constitutes a combination of an acceleration sensor and a gyro sensor. However, at least one of the boom angle sensor S1, the arm angle sensor S2, and the bucket angle sensor S3 may constitute only an acceleration sensor. The boom angle sensor S1 may be a stroke sensor mounted on the boom cylinder 7, a rotary encoder, a potentiometer, an inertia measuring device, or the like. The same applies to the arm angle sensor S2 and the bucket angle sensor S3.

The upper traveling body 3 is equipped with a power source such as an engine 11 and a body tilt sensor S4, which is covered by a cover 3a. The upper portion of the cover 3a of the upper traveling body 3 is provided with an imaging device 80. The imaging device 80 includes the front camera 80F, left camera 80L, rear camera 80B, and right camera 80R.

The left camera 80L and the right camera 80R are positioned inwardly of the shovel PS so that these cameras do not protrude from the side of the shovel PS. The rear camera 80B is also positioned so as not to protrude from the rear surface of the shovel PS and is positioned inwardly from the rear surface of the shovel PS.

The upper traveling body 3 is provided with a cabin 10 as an operator's cabin. At the top of the cabin 10, a GPS device (GNSS receiver) G1 and a transmitter device T1 are provided. The GPS device (GNSS receiver) G1 detects the position of the shovel PS by the GPS function and supplies position data to a machine guidance device 50 in the controller 30. A transmitter T1 transmits information to the outside of the shovel PS. The transmitter T1 transmits information that can be received by a management device 90, which will be described later, for example. The controller 30, a display device 40, an audio output device 43, an input device 45, and a storage 47 are also provided within the cabin 10.

The controller 30 functions as a main controller for controlling the driving of the shovel PS. The controller 30 is configured by an arithmetic processor including a CPU and an internal memory. Various functions of the controller 30 are implemented by executing a program in which the CPU is stored in an internal memory.

The controller 30 also functions as the machine guidance device 50 for guiding the operation of the shovel PS. The machine guidance device 50 informs an operator of work information, such as a distance between a target surface, which is the surface of the target terrain set by the operator, and the working area of the attachment. The distance between the target surface and the working area of the attachment is, for example, the distance between the end of the bucket 6 as an end attachment (tip end of the claw), the back of the bucket 6, the end of the breaker as an end attachment, or the like, and the target surface. The machine guidance device 50 informs the operation information to the operator and guides the operation of the shovel PS through the display device 40, the audio output device 43, or the like.

In this embodiment, the machine guidance device 50 is incorporated into the controller 30, but may be provided separately from the machine guidance device 50 and the controller 30. In this case, as with the controller 30, the machine guidance device 50 is configured by an arithmetic processing device including a CPU and an internal memory. Various functions of the machine guidance device 50 are implemented by executing a program in which the CPU is stored in an internal memory.

The display device 40 displays images containing various work information in response to commands from the machine guidance device 50 included in the controller 30. The display device 40 is, for example, an on-board liquid crystal display connected to the machine guidance device 50.

The audio output device 43 outputs various types of audio information in response to an audio output command from the machine guidance device 50 included in the controller 30. The audio output device 43 includes, for example, an on-board speaker connected to the machine guidance device 50. The audio output device 43 may also include an alarm such as a buzzer.

The input device 45 is a device for the operator of the shovel PS to input various information to the controller 30 including the machine guidance device 50. The input device 45 may include, for example, a membrane switch provided on the surface of the display device 40. The input device 45 may include a touch panel or the like.

The storage device 47 is a device for storing various information. The storage device 47 is a non-volatile storage medium such as, for example, a semiconductor memory. The storage device 47 stores various information output by the controller 30 or the like including the machine guidance device 50.

A gate lock lever 49 is provided between the door of the cabin 10 and the operator's seat to prevent incorrect operation of the shovel PS. The controller 30 controls a gate lock valve 49a (see FIG. 3) to be "closed" when the gate lock lever 49 is depressed and the gate lock valve 49a to be "open" when the gate lock lever 49 is pulled up.

Figure 3:
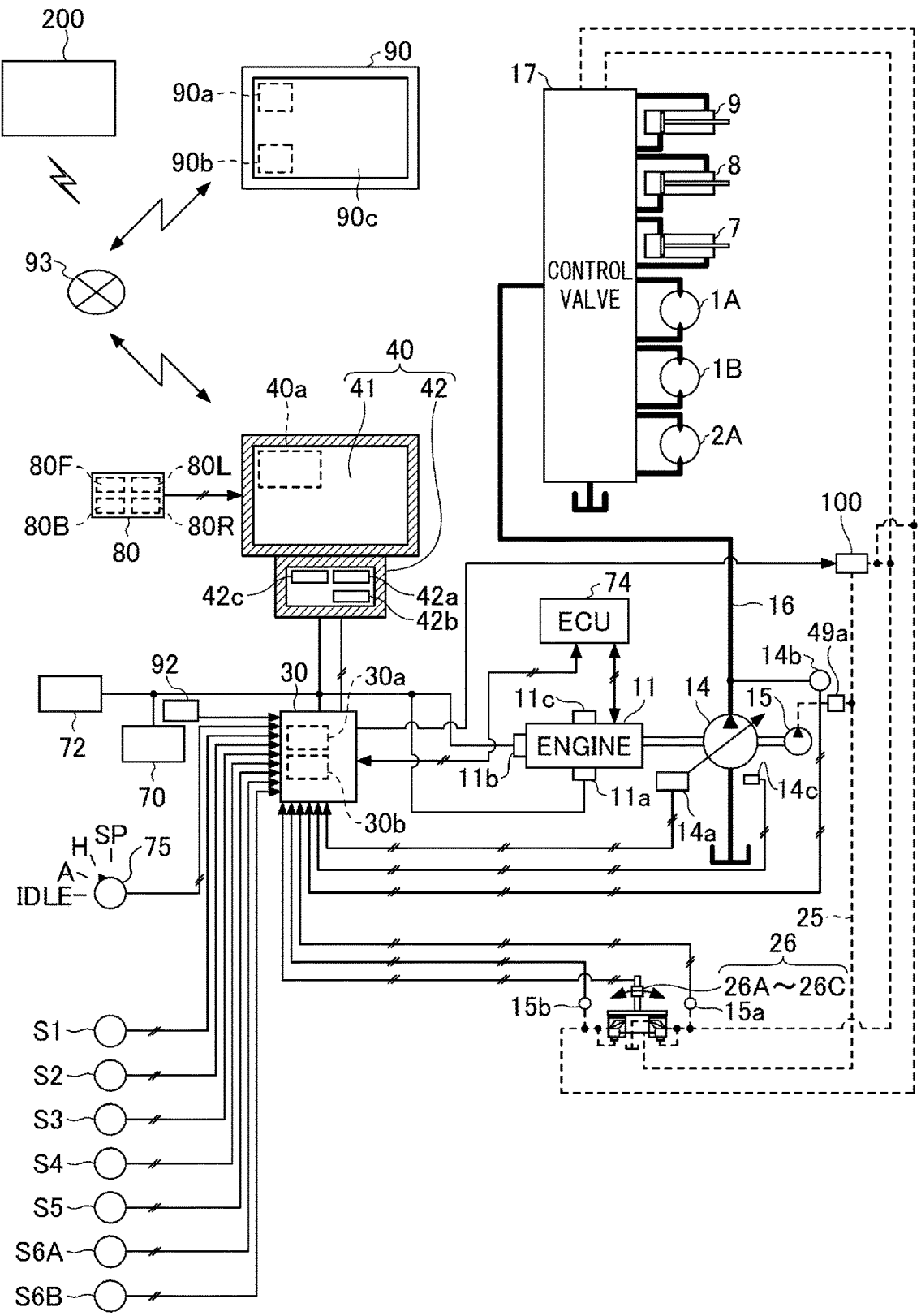
FIG. 3 is a block diagram illustrating an example of a configuration of a driving system of the shovel PS in FIG. 1.

The gate lock valve 49a is a switching valve provided in an oil path between a control valve 17 and operating levers 26A to 26C (see FIG. 3). The gate lock valve 49a is configured to be opened and closed by a command from the controller 30, but may be mechanically connected to the gate lock lever 49 and opened and closed in response to the operation of the gate lock lever 49.

The gate lock valve 49a, in the "closed" state, shuts off the flow of hydraulic oil between the control valve 17 and the operation levers 26A to 26C or the like to disable operation of the operation levers 26A to 26C or the like. The gate lock valve 49a, in the "open" state, communicates hydraulic oil between the control valve 17 and an operation lever or the like to enable operation of the operation levers 26A to 26C or the like. That is, when the operator enters the driver's seat and pulls up the gate lock lever 49, the operator cannot exit the cabin 10 and is ready to operate the various control devices 26 (see FIG. 3) (unlocked state). When the operator depresses the gate lock lever 49, the operator is able to exit the cabin 10 and the various operating devices 26 are not operable (locked state).

A sound collector 92 includes a left microphone 92L, a right microphone 92R, a rear microphone 92B, and a front microphone 92F disposed outside of the cabin 10 and which is an external microphone that collects the sound around the cabin 10. The sound collector 92 is also disposed within the cabin 10 and has an internal microphone 92I for collecting sound within the cabin 10. The sounds collected by the left microphone 92L, the right microphone 92R, the rear microphone 92B, the front microphone 92F, and the internal microphone 92I include sounds such as, for example, language sounds emitted by people, engine sounds of the shovel PS, machine sounds such as work site sounds, and the like.

The left microphone 92L, the right microphone 92R, and the rear microphone 92B each capture sounds from the left, right, and rear directions from the upper traveling body 3 toward the cabin 10. In this embodiment, the left microphone 92L, the right microphone 92R, and the rear microphone 92B are provided on the upper portion of the cover 3a of the upper traveling body 3 and are positioned near the left camera 80L, the right camera 80R, and the rear camera 80B, respectively.

The left microphone 92L, the right microphone 92R, and the rear microphone 92B are connected to the controller 30 via a wiring 91L, wiring 91R, and wiring 91B, respectively, to transmit collected sounds to the controller 30. Thus, the left microphone 92L, the right microphone 92R, and the rear microphone 92B are positioned near the left camera 80L, the right camera 80R, and the rear camera 80B, respectively, to facilitate wiring routing. Note that the left microphone 92L, right microphone 92R, and rear microphone 92B may be disposed, for example, on the upper portion of the cabin 10.

Also, the left microphone 92L and the right microphone 92R are positioned so as not to protrude from the side of the shovel PS and so as to be provided inwardly from the side of the shovel PS. The rear microphone 92B is also positioned so as not to protrude from the rear surface of the shovel PS and is positioned inwardly from the rear surface of the shovel PS.

The front microphone 92F captures a sound from the forward direction from the upper traveling body 3 toward the cabin 10. In this embodiment, the front microphone 92F is positioned in the arm 5. The front microphone 92F is connected to the controller 30 via a wiring 91F and transmits sound to the controller 30. The front microphone 92F may be disposed on the boom 4, the bucket 6, or on the upper portion of the cabin 10, for example.

The interior microphone 92I captures the internal sound of the cabin 10, for example, the sound emitted by the operator. In this embodiment, the interior microphone 92I is disposed on the inner wall surface of the cabin 10. The internal microphone 92I is connected to the controller 30 via a wiring 91I and transmits sound to the controller 30. The internal microphone 92I may be embedded in the display device 40, for example.

The left microphone 92L, the right microphone 92R, the rear microphone 92B, the front microphone 92F, and the interior microphone 92I may be, for example, a single directional microphone that is sensitive to sound for a particular direction. However, one microphone may be used to implement the functions of two or more of the following microphones: left microphone 92L, right microphone 92R, rear microphone 92B, and front microphone 92F, using an omnidirectional (omnidirectional) microphone that captures the sound from all directions equally. This reduces the number of microphones that collect the sound around the shovel PS.

An engine compartment 85 is formed in the upper traveling body 3, and the engine 11 is provided in the engine compartment 85. The engine compartment 85 is covered with an engine cover 86. As illustrated in FIG. 2, a cooling fan 12 is provided on the left side of the engine 11, and a pump 13 including a main pump 14 and a pilot pump 15 (see FIG. 3) is provided on the right side, and a heat exchanger 18 including a radiator is provided on the left side of the cooling fan 12.

Further, an exhaust pipe 19 is connected to the engine 11, and an exhaust gas treatment device 19a for purifying nitrogen oxides (hereinafter, referred to as NOx) in engine exhaust gas is provided on the downstream side of the exhaust pipe 19 in order to comply with higher exhaust gas regulations.

As the exhaust gas treatment device 19a, a urea selective reduction type NOx treatment device using urea water as the liquid reducing agent is adopted. The exhaust gas treatment device 19a sprays a fluid reducing agent (for example, urea water) upstream of a reduction catalyst (not illustrated) provided in the exhaust pipe to reduce NOx in the exhaust gas, and the reduction reaction is accelerated by a reduction catalyst to detoxify NOx.

FIG. 3 is a block diagram illustrating an example of a configuration of a driving system of a shovel PS in FIG. 1. In the example of FIG. 3, the shovel PS is included in the shovel PS management system 300. The management system 300 includes the shovel PS, a management device 90 for communicating with the shovel PS, and a supporting device 200 for supporting in the management of the shovel PS. The number of shovels PS included in the management system 300 may be arbitrary.

The driving system of the shovel PS mainly includes the engine 11, the main pump 14, the pilot pump 15, the control valve 17, the operating device 26, the controller 30, an engine controller (ECU) 74, an engine speed adjustment dial 75, an operation valve 100, and the like.

The engine 11 is a driving source for the shovel PS and is, for example, a diesel engine operating to maintain a predetermined engine speed. The output shaft of the engine 11 is connected to the input shaft of main pump 14 and pilot pump 15.

The main pump 14 is a hydraulic pump for supplying hydraulic oil to the control valve 17 via a high pressure hydraulic line 16, for example, a swash plate variable displacement hydraulic pump.

The pilot pump 15 is a hydraulic pump for supplying hydraulic oil to various hydraulic control devices via a pilot line 25, for example, a fixed displacement hydraulic pump.

The control valve 17 is a hydraulic control valve which controls the hydraulic system in the shovel PS. The control valve 17 selectively supplies hydraulic oil supplied from the main pump 14 to one or more of the boom cylinder 7, the arm cylinder 8, the bucket cylinder 9, a driving hydraulic motor (right) 1A, a driving hydraulic motor (left) 1B, and a turning hydraulic motor 2A, for example. In the following description, the boom cylinder 7, the arm cylinder 8, the bucket cylinder 9, the driving hydraulic motor (right) 1A, the driving hydraulic motor (left) 1B, and the turning hydraulic motor 2A are collectively referred to as "hydraulic actuators".

The operating device 26 is a device used by the operator for operation of the hydraulic actuator, through the pilot line 25, for supplying hydraulic oil supplied from the pilot pump 15 to a pilot port of a flow control valve corresponding to each of the hydraulic actuators. The pressure of the hydraulic oil supplied to each of the pilot ports is in accordance with the direction and amount of operation of the operation levers 26A to 26C corresponding to each of the hydraulic actuators.

The controller 30 is a controller for controlling the shovel PS and is configured by a computer including, for example, a CPU, a RAM, a ROM, or the like. The CPU of the controller 30 executes the processing corresponding to each of the shovel PS programs by reading the programs corresponding to the operations and functions of the shovel PS from the ROM and executing the programs while expanding the RAM.

The ECU 74 is a device for controlling the engine 11. The ECU 74 outputs to the engine 11, for example, a fuel injection amount for controlling the speed (number of rotations) of engine 11 in accordance with the engine speed (mode) set by the operator by the engine speed adjustment dial 75 based on a command from the controller 30.

The engine speed adjustment dial 75 is a dial for adjusting the number of rotations of the engine, and the engine speed can be switched in four steps in an embodiment of the present invention. For example, the engine speed adjustment dial 75 allows for switching engine speed in four stages: SP, H, A, and IDLE modes. FIG. 2 illustrates a state in which the H mode is selected by the engine speed adjustment dial 75.

The SP mode is the work mode selected when the workload is to be prioritized, and the highest engine speed is used. The H mode is the work mode selected when both the amount of work and fuel economy are to be achieved, and the second highest engine speed is used. The A mode is the work mode selected when the shovel PS with low noise while prioritizing fuel economy is to be achieved, and the third highest engine speed is used. The IDLE mode is the work mode selected when the engine is to be idle, and the lowest engine speed is used. The engine 11 is constantly controlled by the engine speed in the work mode set by the engine speed adjustment dial 75.

The operation valve 100 is a valve used by the controller 30 for operation of the hydraulic actuator and through pilot line 25 supplies hydraulic oil supplied from the pilot pump 15 to the pilot port of the flow control valve corresponding to each of the hydraulic actuators. The pressure of the hydraulic oil supplied to each of the pilot ports is the pressure corresponding to the control signal from the controller 30. The operation valve 100 is provided at at least one of the rod side and the bottom side corresponding to the cylinder of the boom 4, the arm 5, and the bucket 6 constituting the attachment. The operation valve 100 may be provided on both the rod side and the bottom side.

The predetermined operation of this embodiment is a movement from a predetermined first orientation to a predetermined second orientation. Accordingly, the predetermined operation starts at the first predetermined position and ends at the second predetermined position. The first and second positions may be different or the same. That is, the predetermined operation may be an operation to change the orientation from one predetermined position to another, or an operation to return from a predetermined position to a predetermined position.

In addition, the driving hydraulic motor (right) 1A, the driving hydraulic motor (left) 1B, and the turning hydraulic motor 2A may be provided at at least one of the discharge side and the suction side, or may be provided at both the discharge side and the suction side.

In this case, the predetermined operation can be performed even when the control device 26 is in the neutral position. Further, a pressure reducing valve disposed between the control valve 17 and the control device 26 may function as the control valve 100. In this case, by sending the decompression command from the controller 30 to the pressure reducing valve with the control device 26 set to the maximum, a stable operation command can be given to the control valve 17.

The shovel PS is provided with the display device 40.

The display device 40 is connected to the controller 30 via a communication network such as Controller Area Network (CAN), Local Interconnect Network (LIN), and the like. The display device 40 may be connected to the controller 30 via dedicated lines.

The display device 40 includes a conversion processor 40a for generating an image to be displayed on the image display 41. The conversion processor 40a generates a camera image to be displayed on the image display 41 based on the output of the imaging device 80. Therefore, the imaging device 80 is connected to the display device 40, for example, via a dedicated line. The conversion processor 40a generates an image to be displayed on the image display 41 based on the output of the controller 30.

The imaging device 80 includes the front camera 80F, left camera 80L, rear camera 80B, and right camera 80R.

The front camera 80F is provided on the front side of the cabin 10, for example, the ceiling portion of the cabin 10, to image the front side of the shovel PS and the operation of the boom 4, arm 5, and bucket 6. The left camera 80L is provided, for example, on the left side of the upper traveling body 3 above the cover 3a to image the left side of the shovel PS.

The rear camera 80B is provided on the rear side of the upper traveling body 3, for example, on the rear side of the upper traveling body 3 above the cover 3a, and images the rear of the shovel PS. The right camera 80R is provided, for example, on the right side of the upper traveling body 3 above the cover 3a to image the right side of the shovel PS. The front camera 80F, the left camera 80L, the rear camera 80B, and the right camera 80R are digital cameras having an imaging device such as, for example, a CCD, a CMOS, or the like, and transmit the captured images to the display device 40 provided in the cabin 10.

The sound collector 92 has a left microphone 92L, a right microphone 92R, a rear microphone 92B, a front microphone 92F, and an interior microphone 92I. The sound collected by each microphone included in the sound collector 92 is output by an audio output device 43.

The conversion processor 40a may be implemented as a function provided by the controller 30 rather than as a function provided by the display device 40. In this case, the imaging device 80 is connected to the controller 30 rather than the display device 40.

The display device 40 also includes a switch panel as input 42. The switch panel is a panel that includes various hardware switches. The switch panel includes, for example, a light switch 42a as a hardware button, a wiper switch 42b, and a window washer switch 42c.

The light switch 42a is a switch for switching the light on and off mounted on the outside of the cabin 10. The wiper switch 42b is a switch for switching the wiper on and off. The window washer switch 42c is also a switch for injecting the window washer liquid.

The display device 40 also operates by receiving power from a battery 70. The battery 70 is charged with power generated by the alternator 11a (generator) of the engine 11. The power of the battery 70 is also supplied to an electrical component 72 of the shovel PS other than the controller 30 and the display 40. A starter 11b of the engine 11 is also driven by power from the battery 70 to start the engine 11.

The engine 11 is controlled by the ECU 74. From the ECU 74, various data representing the state of the engine 11 (for example, data representing the cooling water temperature detected by a water temperature sensor 11c) is constantly transmitted to the controller 30. Accordingly, the controller 30 stores this data in a temporary storage 30a and can transmit the data to the display device 40 when needed.

Various types of data are supplied to the controller 30 as follows and are stored in the temporary storage 30a of the controller 30. The stored data may be transmitted to the display device 40 when needed.

First, a regulator 14a of the main pump 14, which is a variable displacement hydraulic pump, transmits data indicative of a swash plate angle to the controller 30. Further, data representing the discharge pressure of the main pump 14 is transmitted from the discharge pressure sensor 14b to the controller 30. The oil temperature sensor 14c is also provided in the line between the main pump 14 and the tank in which the main pump 14 has intake of hydraulic oil, and data representing the temperature of the hydraulic oil flowing through the line is transmitted from the oil temperature sensor 14c to the controller 30.

The pilot pressure fed to the control valve 17 when the operation levers 26A to 26C are operated is detected by the hydraulic sensors 15a and 15b and data indicative of the detected pilot pressure is transmitted to the controller 30.

Further, from the engine speed adjustment dial 75, data indicating the setting state of the engine speed is constantly transmitted to the controller 30.

The shovel PS is capable of communicating with the management device 90 through the communication network 93.

The management device 90 is, for example, a computer or the like provided in a manufacturer of the shovel PS or a service center, and a professional staff (designer, service technician, or the like) can remotely know the status of the shovel PS. The controller 30 stores the detected data from the various state detecting sensors included in the shovel PS in the temporary storage 30a or the like and transmits the stored data to the management device 90. As described above, the data acquired during the predetermined operation is transmitted to the management device 90 as data for various diagnostic purposes, which will be described later.

The controller 30 may have a wireless communication function and be capable of communicating with the management device 90 via a communication network 93. The expert staff analyzes the data of the detected values from the various state detecting sensors transmitted from the shovel PS to the management device 90 and received by a receiving device (part) 90a of the management device 90, and determines the state of the shovel PS.

For example, the expert staff may diagnose whether there is a failure or malfunction, and if there is a failure or malfunction, identify the location of the failure or malfunction, the cause of the failure or malfunction, or the like. As a result, it is possible to bring the parts necessary for repairing the shovel PS in advance, thereby reducing the time spent for maintenance and repair. Details of the functions of the controller 30 will be described below.

The management device 90 includes a processing device 90b. The processing device 90b may perform calculation processing of the detected value from the various state detecting sensors that are input with a predetermined program and transmitted from the shovel PS by the program. For example, the processing device 90b includes an input diagnostic program and may perform failure diagnosis or failure prediction using the detected value transmitted from the shovel PS by the diagnostic program. The calculation result of the processing device 90b may be displayed on a display 90c of the management device 90.

The management device 90 may be a device capable of communicating indirectly with the shovel PS via a server or the like provided in the shovel PS manufacturer or service center. The management device 90 may be a permanent type computer provided in a manufacturer or a service center, or a portable computer that can be carried by a person in charge of the operation, for example, a smartphone, a tablet terminal, or the like that is a multifunction-type portable information terminal as a portable terminal.

In the case where the management device 90 is a portable type, the management device 90 can be carried to an inspection or repair site. Therefore, inspection or repair work can be performed while looking at the display (display 90c) of the management device 90. As a result, the efficiency of inspection or repair work can be improved.

Further, in the case where the management device 90 is a portable terminal, communication with the shovel PS may be performed directly by near range communication such as Bluetooth (Registered Trademark), infrared communication, or the like without the communication network. In this case, an instruction to execute the predetermined operation is transmitted from the mobile terminal to the shovel by operation of screen input or audio input to the mobile terminal. That is, an instruction to store the detected value from the state detecting sensor during the predetermined operation in association with the predetermined operation is transmitted from the portable terminal to the shovel. Then, the operation result of the predetermined operation can be transmitted from the shovel to the mobile terminal, so that the operation result of the predetermined operation can be confirmed on the screen of the mobile terminal.

The supporting device 200 may be, for example, a portable computer, for example, a smartphone, a tablet terminal, or the like, which is a multi-function personal information terminal as a portable terminal. The supporting device 200 may, for example, display information indicative of the result of failure diagnosis by the management device 90. The supporting device 200 may also display a detected value acquired by the state detecting sensor of the shovel PS.

The various status detecting sensors included in the shovel PS are sensors that detect the operation status of each part of the shovel PS. Various state detecting sensors include a boom angle sensor S1, an arm angle sensor S2, a bucket angle sensor S3, a body tilt sensor S4, a turning angle sensor S5, a traveling rotation sensor (right) S6A, a traveling rotation sensor (left) S6B, an imaging device 80, a sound collector 92, and the like.

In the following description, image data acquired by the imaging device 80 included in the state detecting sensor and sound data acquired by the sound collector 92 included in the state detecting sensor are sometimes referred to as environmental information of the shovel PS during a predetermined operation.

In the following description, the detected values acquired from the boom angle sensor S1, the arm angle sensor S2, the bucket angle sensor S3, the body tilt sensor S4, the turning angle sensor S5, the traveling rotation sensor (right) S6A, the traveling rotation sensor (left) S6B, and the like included in the state detecting sensor are sometimes called the operation information of the shovel PS. That is, the operation information according to this embodiment is information indicating the status of each part of the shovel PS in operation.

The boom angle sensor S1 is provided in the support (joint) of the boom 4 in the upper traveling body 3, and detects the angle (boom angle) from the horizontal plane of the boom 4. An optional angle sensor, such as a rotary potentiometer, may be used for the boom angle sensor S1, and the same applies to the arm angle sensor S2 and the bucket angle sensor S3, which will be described later. The detected boom angle is transmitted to the controller 30.

The arm angle sensor S2 is provided in a support (joint) of the arm 5 with respect to the boom 4, and detects the angle (arm angle) of the arm 5 with respect to the boom 4. The detected arm angle is transmitted to the controller 30.

The bucket angle sensor S3 is provided in a support (joint) of the bucket 6 with respect to the arm 5 to detect the angle (bucket angle) of the bucket 6 with respect to the arm 5. The detected bucket angle is transmitted to the controller 30.

The body tilt sensor S4 is a sensor that detects the tilt angle in two axial directions (forward-rearward direction, and left-right direction) with respect to the horizontal plane of the shovel PS. The body tilt sensor S4 may be, for example, a liquid encapsulated capacitive tilt sensor, or any tilt sensor. The detected tilt angle is transmitted to the controller 30.

The rotation angle sensor S5 detects the rotation angle of the upper traveling body 3 by the turning equipment 2. Any angle sensor, such as, for example, a rotary encoder, may be used for the turning angle sensor S5. The detected turning angle is transmitted to the controller 30.

The traveling rotation sensor (right) S6A and the traveling rotation sensor (left) S6B detect the rotation speeds of the traveling hydraulic motor (right) 1A and the traveling hydraulic motor (left) 1B, respectively. Any rotation sensor, such as a magnetic type, may be used for the traveling rotation sensor (right) S6A and the traveling rotation sensor (left) S6B. Each detected rotational speed is transmitted to the controller 30.

As described above, various state detecting sensors included in the shovel PS include the water temperature sensor 11c, the regulator 14a, the discharge pressure sensor 14b, the oil temperature sensor 14c, the oil pressure sensors 15a and 15b, the engine speed adjusting dial 75, the imaging device 80, and the sound collector 92. The detected values detected by these are also transmitted to the controller 30. The data transmitted from the various state detecting sensors included in the shovel PS to the controller 30 is stored in the temporary storage 30a of the controller 30.

The controller 30 associates and stores the environmental information acquired by the state detecting sensor, the operation information, and the information representing the predetermined operation. In other words, the controller 30 stores the sound data acquired by the state detecting sensor, the video data, and the operation information in association with the information indicating the predetermined operation.

In this embodiment, the sound data in the predetermined operation can be shared by an operator of the shovel PS and a service person or the like by associating and accumulating the information as described above.

Figure 4:
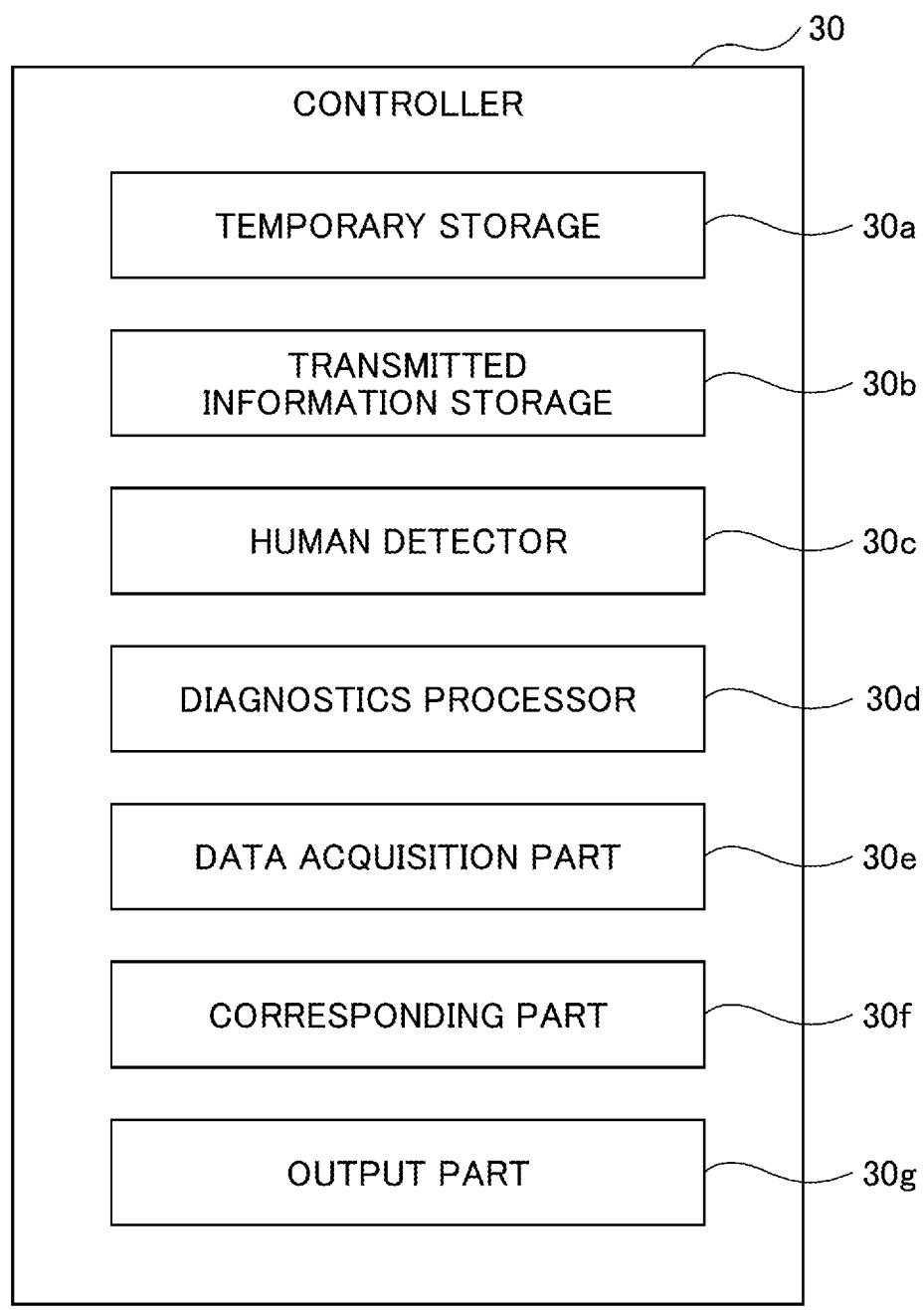
FIG. 4 is a diagram illustrating a function of a controller.

Next, the function of the controller 30 according to the present embodiment will be described with reference to FIG. 4. FIG. 4 is a diagram illustrating a function of the controller.

The controller 30 according to this embodiment includes the temporary storage 30a, a transmitted information storage 30b, a human detector 30c, the diagnostic processor 30d, a data acquisition device (part) 30e, a corresponding part 30f, and an output device (part) 30g.

The temporary storage 30a temporarily stores data of a detected value output from various state detecting sensors included in the shovel PS. Therefore, the environmental information and the operation information included in the state detecting sensor are temporarily stored in the temporary storage 30a.

The transmitted information storage 30b stores the transmitted information transmitted to the management device 90. Transmitted information is information that includes environmental information and operation information. Details of the transmitted information are described later.

The human detector 30c detects a person present nearby the shovel PS based on image data around the shovel PS captured by the imaging device 80. In other words, the human detector 30c determines whether or not a person or the like exists around the shovel PS. A variety of human body sensing sensors capable of detecting people can be used to determine whether or not there is a person around the shovel PS.

The diagnostics processor 30d performs various types of diagnostics according to the diagnosis points of the shovel PS.

The data acquisition device 30e acquires a detection value of the state detecting sensor while the shovel PS is performing the predetermined operation.

Specifically, the data acquisition device 30e acquires environmental information including image data captured by the imaging device 80 during a predetermined operation and sound data collected during a predetermined operation by the sound collector 92.

The data acquisition device 30e acquires operation information that is a detection value during the predetermined operation of the boom angle sensor S1, the arm angle sensor S2, the bucket angle sensor S3, the body tilt sensor S4, the turning angle sensor S5, the traveling rotation sensor (right) S6A, the traveling rotation sensor (left) S6B, or the like.

This section describes environmental information.

The image data included in the environmental information according to this embodiment is given information specifying the imaging device 80 that acquired the image data. Specifically, the image data captured by the front camera 80F is given information specifying the front camera 80F, and the image data captured by the left camera 80L is given information specifying the left camera 80L.

The sound data included in the environmental information according to the present embodiment is given information specifying the sound collector 92 that collects the sound data. Specifically, the sound data collected by the front microphone 92F is given information specifying the front microphone 92F, and the sound data collected by the left microphone 92L is given information specifying the left microphone 92L. In this embodiment, the information associated with the sound data and the information specifying the sound collector 92 that collects the sound data are examples of the information regarding the sound.

In this embodiment, the image data and the sound data are respectively provided with information specifying the image device 80 and information specifying the sound collector 92, so that the image data and the sound data can be associated with a position where the image data is acquired around the shovel PS.

In this embodiment, the sound data can be associated with the position where the sound data is acquired and the members of the shovel PS disposed at this position by associating the sound data with the position where the sound data is acquired.

For example, the sound data provided to identify the left microphone 92L includes sound during operation of the shovel PS cooling fan 12 and heat exchanger 18. Also, for example, the sound data provided with information specifying the right microphone 92R includes the sound during operation of the shovel PS exhaust gas processor 19a. Also, for example, sound data with information specifying the rear microphone 92B includes sound during operation of the engine 11 of the shovel PS or pump 13.

In this embodiment, each microphone included in the sound collector 92 is disposed in the vicinity of a corresponding camera included in the imaging device 80, but is not limited thereto. Each microphone included in the sound collector 92 may be positioned, for example, in close proximity to a corresponding member of the shovel PS. For example, a microphone may be disposed near the turning equipment 2 or a microphone may be disposed on the engine cover 86.

The corresponding part 30f corresponds to the environmental information during the predetermined operation of the shovel PS acquired by the data acquisition device 30e and transmits the information to the management device 90. The corresponding part 30f stores the information in the transmitted information storage 30b.

The transmitted information may include information indicating the date and time when the data acquisition device 30e acquired the environmental information and the operation information, and machine identification information specifying the machine of the shovel PS. The transmitted information may include information specifying the predetermined operation performed by the shovel PS when the data acquisition device 30e acquires the environmental information and operation information.

The output device 30g outputs transmitted information. In the following description, transmitting the transmitted information to the management device 90 may be referred to as outputting the transmitting information. Further, in the following description, transmitting the transmitted information to the supporting device 200 may be expressed as outputting the transmitted information. In the following description, it may be expressed that the transmitted information is output by displaying the transmitted information on the display device 40.

Figure 5:
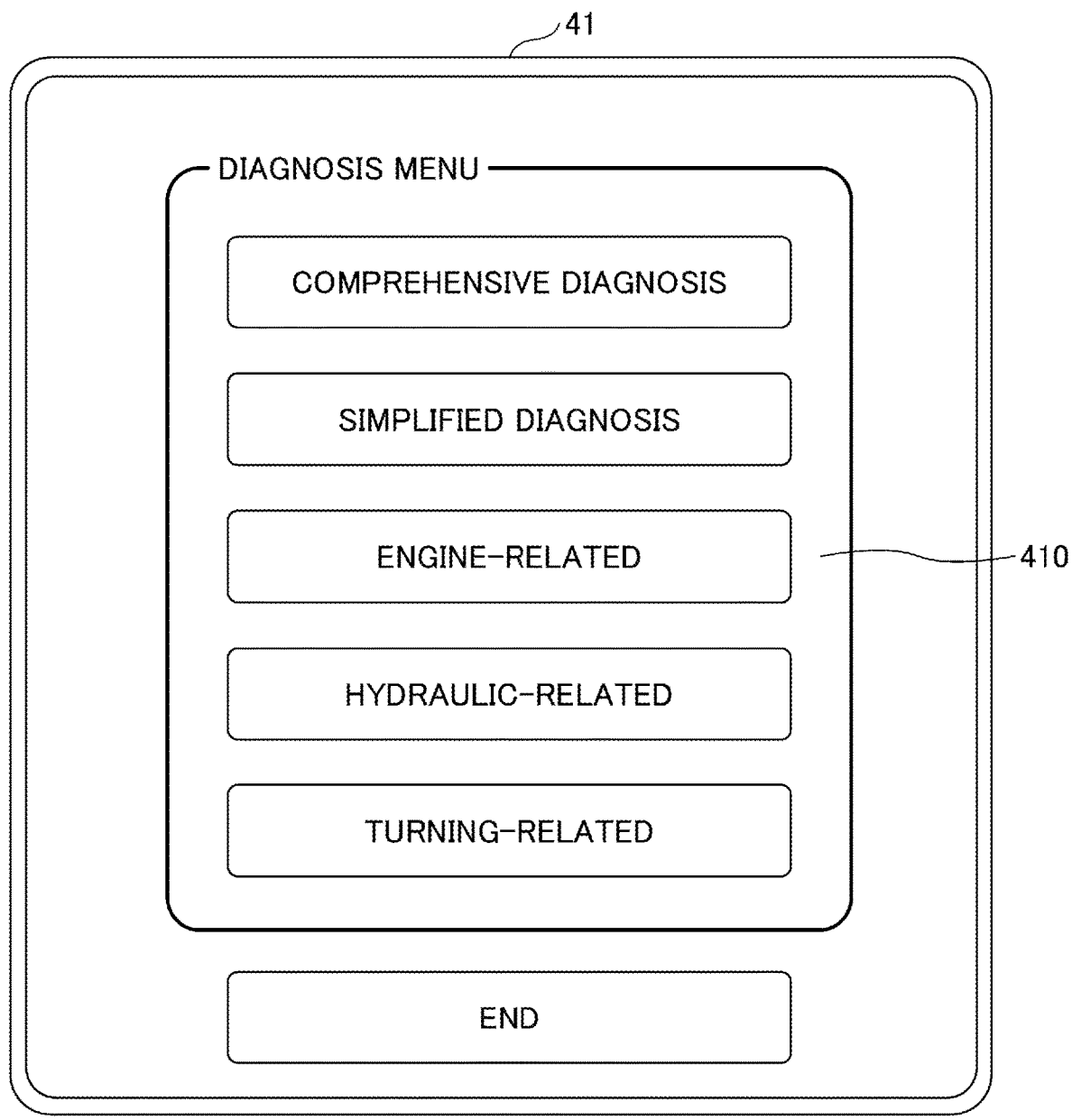
FIG. 5 is a diagram illustrating an example of a screen for selecting a diagnostic menu displayed on an image display.

Next, the processing of the controller 30 according to the present embodiment will be described. FIG. 5 is a diagram illustrating an example of a diagnosis menu selection screen displayed on an image display.

As illustrated in FIG. 5, the screen for selecting the diagnostic menu includes a diagnostic menu display 410. The image displayed on the diagnostic menu display 410 is generated from various data transmitted from the controller 30 by the conversion processor 40a of the display device 40.

The diagnosis menu display 410 displays a list of a plurality of diagnosis items according to diagnosis items or the like. In the example illustrated in FIG. 5, a list of the five diagnostic items of "Comprehensive diagnosis," "Simple diagnosis," "Engine-related," "Hydraulic-related," and "Turning-related" is displayed in the diagnosis menu display 410. The diagnostic item is previously stored in the ROM or the like of the controller 30. Each of the diagnostic items may have one type of predetermined operation performed to perform the diagnosis, or the diagnostic items may have more than one type of predetermined operation performed to perform the diagnosis.

Further, the image display 41 displays a menu of "End" which is used when the display of the diagnosis menu selection screen is terminated. The operator can select any diagnostic item by touching the diagnostic item to be executed from the selection screen of the diagnostic menu displayed on the image display 41. The method of selecting the diagnostic item may be, for example, a button operation instead of a touch operation.

The "Comprehensive diagnosis" is a diagnostic item for comprehensively diagnosing whether each part of the shovel PS is operating normally or not, and is associated with, for example, engine-related, hydraulic-related, and turning-related predetermined operations.

When the operator selects the "Comprehensive diagnosis", the controller 30 performs the predetermined operations related to the engine, hydraulic, and turning of the shovel PS in a predetermined order and associates the information specifying the predetermined operations performed with the detected values of the state detecting sensors acquired during the predetermined operations. The "Comprehensive diagnosis" may be associated with other predetermined operations in place of the above-described predetermined operations (engine-related, hydraulic-related, and turning-related).

The predetermined operation for collecting the data for the diagnosis may be performed automatically, and for each operation, the predetermined operation for the diagnosis may be manually performed by a lever operation by an operator by displaying guidance on the display device.

The "Simplified diagnosis" is a diagnostic item for easily diagnosing whether or not each part of the shovel PS is operating normally. For example, a part of the shovel PS related to an engine and a part of the shovel related to hydraulics is associated with a predetermined operation that does not include an attachment operation and a turning operation of the shovel PS. When the operator selects a "Simple diagnosis", the controller 30 performs a portion of the shovel PS engine-related and hydraulic-related predetermined operation to associate the information specifying the predetermined operation performed with the detected value of the state detecting sensor acquired during the predetermined operation.

Also, the "Simplified diagnosis" may be associated with other predetermined operations in place of the above-described predetermined operations (some engine-related operations and some hydraulic-related operations) or along with the above-described predetermined operations.

The "Engine-related" is a diagnostic item that includes one or more predetermined operations for diagnosing whether the engine 11 is operating normally. When the operator selects "Engine-related", the controller 30 performs the predetermined operation related to the engine of the shovel PS.

The "Hydraulic-related" is a diagnostic item that includes one or more predetermined operations for diagnosing whether a hydraulic system is operating normally, including, for example, a hydraulic pump such as the main pump 14, pilot pump 15, or one or more predetermined operations for diagnosing a hydraulic actuator.

The "Hydraulic-related" includes, for example, "closing the arm to the stroke end (arm closing operation)" as the predetermined operation α and "raising the boom to the stroke end (boom raising operation)" as the predetermined operation β. The term "Hydraulic-related" may also include other predetermined operations in place of or along with the above predetermined operations (predetermined operations α, β).

Here, an example of a predetermined operation for an attachment such as the boom 4 or the arm 5 will be described. First, by outputting a command from the controller 30 to the operation valve 100, the boom 4 is rotated to the stroke end when the boom is raised. Subsequently, a continuous load is applied. That is, the hydraulic oil continues to flow to the boom cylinder 7 by the control valve 17. In this state, the boom 4 has reached the stroke end. Therefore, the hydraulic oil is discharged from the relief valve to the tank. By reaching the stroke end of the cylinder in this manner, the load can be continuously applied.

This enables detection of diagnostic data in a reproducible and stable state in any working environment. The same applies to the arm 5 and the bucket 6. Further, after reaching the stroke end of the cylinder, the load may be changed by adjusting the regulator 14*a* of the main pump 14 or by changing the engine speed.

By detecting a change in the cylinder pressure of the attachment such as the boom 4 or the change in the discharge pressure of the main pump 14 when a load is changed, a dynamic state can be reproduced and the diagnostic accuracy can be further improved. As a result, the main pump 14 and the engine 11 can be diagnosed as well as the hydraulic circuit.

The "Turning-related" is a diagnostic item that includes one or more predetermined operations for diagnosing whether or not the turning equipment 2 (traveling hydraulic motor 2A, traveling reduction gear, and the like) is operating normally or not. The "Turning-related" includes, for example, "turning while the attachment is closed (turning operation)" as a predetermined operation. The term "Turning-related" may also include other predetermined operations in place of the above predetermined operations (predetermined operations of the turning operation) or along with the above predetermined operations. Here, an example of a predetermined operation for a driving part using a hydraulic motor such as a turn or traveling will be described.

First, by outputting a command from the controller 30 to the operation valve 100, an attachment, such as the boom 4, is set to a predetermined position. In particular, the turning load is greatly affected by the turning moment of inertia based on the attitude change of the attachment in the turning diagnosis. Therefore, the boom 4, arm 5, bucket 6, or the like is driven so that the attachment is in a predetermined position.

Further, if a relatively heavy end attachment, such as a breaker, is mounted on the bucket 6, the bucket 6 may be notified to the operator by audio, screen display, or the like to change to a predetermined bucket 6. In this way, the attachment is adjusted before driving the turning drive part so that the moment of inertia generated during the turning is the same. After adjustment is completed, a predetermined drive command is output from the controller 30 to the operation valve 100 to perform a turning operation. The turning hydraulic motor 2A can execute the predetermined operation for the turning based on the driving command to accelerate, maintain constant speed, and decelerate the turning hydraulic motor 2A.

Accordingly, it is possible to diagnose the turning hydraulic motor 2A, the hydraulic circuit for the turning hydraulic motor 2A, and the reduction gear. For example, if a failure occurs in the relief valve of the hydraulic circuit, the turning acceleration becomes worse. In this case, the failure can be known from the change of the pressure detection value of the hydraulic circuit of the turning hydraulic motor 2A.

Figure 6:
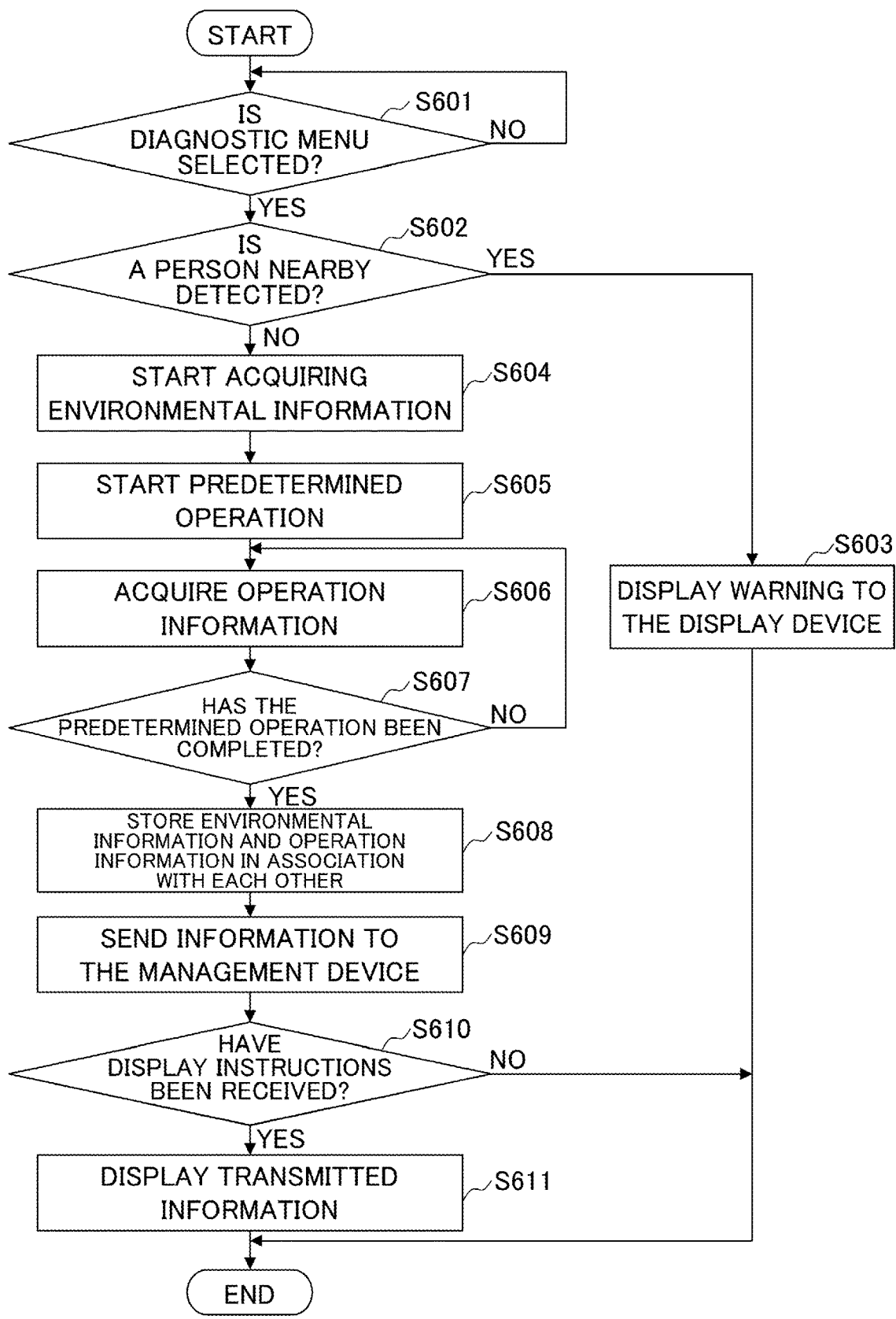
FIG. 6 is a flowchart illustrating the process of the shovel controller.

FIG. 6 is a flowchart illustrating the processing of the controller of the shovel.

First, in Step S601, the controller 30 determines whether or not a diagnosis item is selected from the diagnosis menu selection screen by the operator by the diagnosis processor 30*d*. In step S601, if the diagnostic item is not selected, the controller 30 waits until the diagnostic item is selected.

In Step S601, when the diagnostic item is selected, the controller 30 determines whether or not there is a person or the like around the shovel PS by the human detector 30*c* (Step S602).

In Step S602, when a person is detected in the surrounding area, the controller 30 displays a warning indicating the presence of a person in the surrounding area in the display device 40 (step S603) and stops the operation of the shovel PS to terminate the processing by the diagnostic processor 30*d*.

In Step S602, when a person is not detected in the surrounding area, the controller 30 starts acquiring environmental information by the data acquisition device 30*e* (Step S604). In other words, the controller 30 starts the image data captured by the imaging device 80 and the sound collection of the sound data by the sound collector 92 by the data acquisition device 30*e*.

Subsequently, in Step S604, the controller 30 starts the predetermined operation associated with the selected diagnostic item by the diagnosis processor 30*d*.

Subsequently, in Step S605, the controller 30 acquires the operation information of the shovel PS during the predetermined operation by the data acquisition device 30*e*.

Subsequently, in Step S607, the controller 30 determines whether or not the predetermined operation has been completed.

In Step S607, when the predetermined operation has not been completed, the controller 30 returns to Step S606.

In Step S608, when the predetermined operation is completed in Step S607, the controller 30 is acquired by the data acquisition device 30*e* and is in association with the environmental information held in the temporary storage 30*a* as transmitted information, and is stored in the transmitted information storage 30*b*.

Subsequently, in Step S609, the controller 30 transmits the transmitted information to the management device 90 by the output device 30*g*. The management device 90 receives the transmitted information by the receiving device 90*a*.

The management device 90 performs diagnostics based on a predetermined algorithm using information received by the receiving device 90*a*. The management device 90 may transmit diagnostic results to the controller 30 of the shovel PS or the supporting device 200 after executing algorithm-based diagnostics. Thus, the diagnosis result can be confirmed by the display device 40 of the shovel PS or the supporting device 200.

Subsequently, in Step S610, the controller 30 determines whether or not the input of the operation indicating the display of the transmitted information is received. In Step S610, if the operation instructing the display is not accepted, the controller 30 terminates the process.

In Step S610, when an operation instructing a display is received, the controller 30 displays the transmitted information to the display device 40 by the output device 30*g* (Step S611) and terminates the process.

Figure 7:
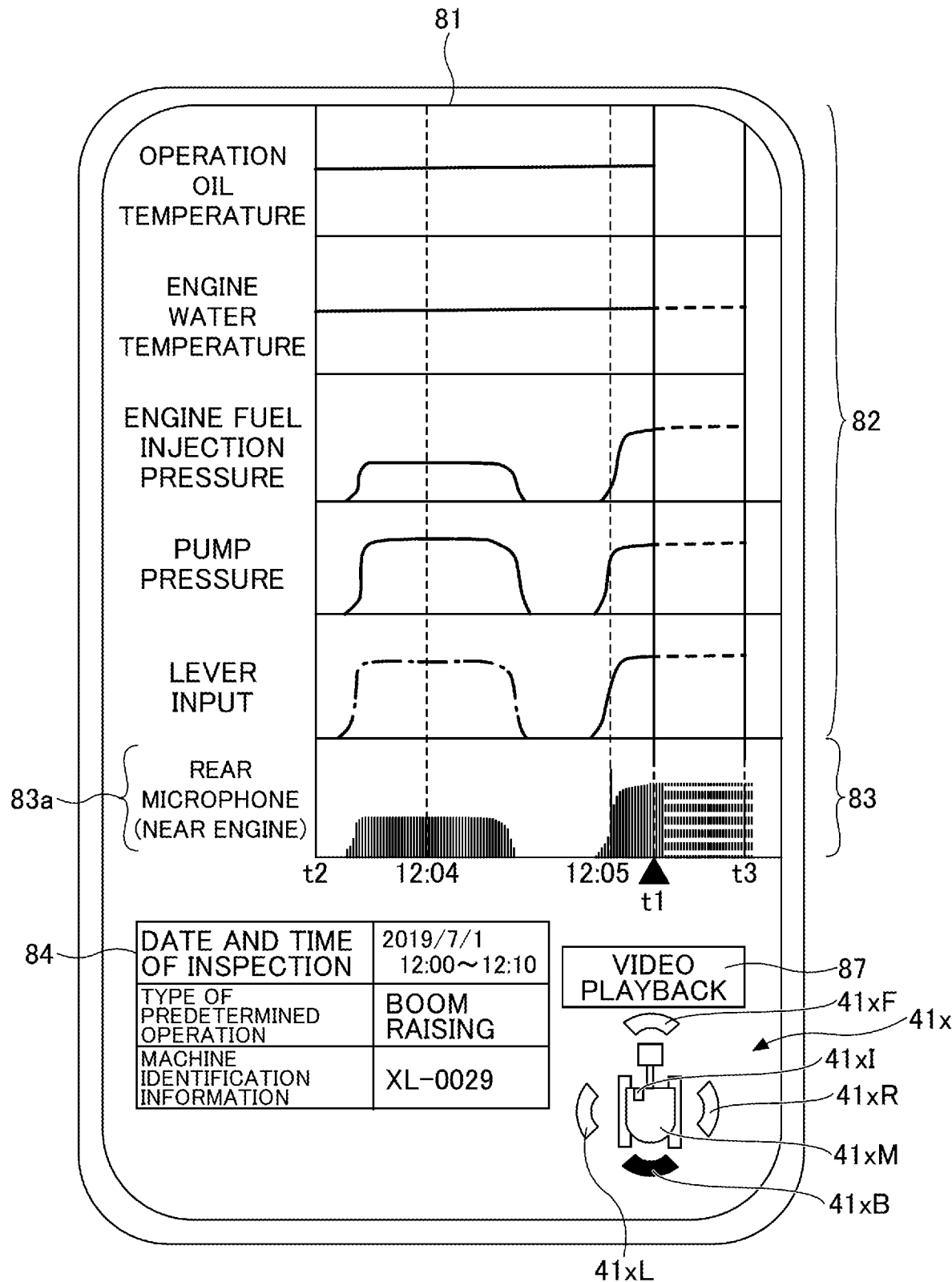
FIG. 7 is a first diagram illustrating a display example of transmitted information.

Hereinafter, an example of display of transmitted information will be described. FIG. 7 is a first diagram illustrating a display example of the transmitted information.

FIG. 7 illustrates an example of display of transmitted information when the engine load increases and abnormal noise is heard from the vicinity of the engine during boom raising.

A screen 81 illustrated in FIG. 7 is, for example, displayed on the image display 41 of the display device 40. The screen 81 displays display areas 82, 83, and 84, an operation button 87, and an icon image 41*x*.

The display area 82 displays the operating information during the predetermined operation. Specifically, in the display area 82, as the operation input quantity, the pilot pressure (lever input) detected by the hydraulic sensors 15*a* and 15*b*, the pump pressure (physical quantity) detected by the discharge pressure sensor 14*b*, the fuel injection pressure (physical quantity) of the engine fed from the ECU 74, the engine water temperature (physical quantity) fed from the ECU 74, and the temperature of the hydraulic oil detected by the oil temperature sensor 14c are displayed as a time chart in which the time is horizontal axis.

The display area 83 displays environmental information during the predetermined operation. Specifically, a waveform representing sound data collected by the sound collector 92 as environmental information is displayed in the display area 82 as a time chart with time on the horizontal axis.

At this time, the sound data collected by the sound collector 92 is output by the audio output device 43. The details of the sound data displayed in the display area 83 will be described later.

The display area 84 displays the date and time when the shovel PS performed the predetermined operation, information specifying the predetermined operation performed by the shovel PS, and machine identification information of the shovel PS.

Specifically, the display area 84 displays the name of the predetermined operation as information specifying the predetermined operation, and the machine identification information of the shovel PS is displayed as information specifying the shovel PS.

The operation button 87 is a button for playing back the video data including the sound data in which the waveform is displayed in the display area 83. In this embodiment, when the operation button 87 is operated, the screen 81 shifts to the video playback screen of the shovel PS during the predetermined operation captured by the imaging device 80.

The icon image 41x is an image for selecting a microphone that displays the waveform of the sound data in the display area 83 from among the microphones included in the sound collector 92 of the shovel PS. More specifically, the icon image 41x is an image representing a relative relationship between the position of the microphone and the direction of the attachment of the upper traveling body 3.

The display area 83 displays the waveform of the sound data collected by the selected microphone in the icon image 41x.

The icon image 41x of this embodiment includes an image 41xM of the shovel PS, an image 41xF indicating the front of the shovel PS, and an image 41xB indicating the rear of the shovel PS. The icon image 41x includes an image 41xL indicating the left side of the shovel PS, an image 41xR indicating the right side of the shovel PS, and an image 41xI indicating the cabin 10.

The images 41xF, 41xB, 41xL, 41xR, and 41xI are respectively provided with microphones included in the sound collector 92 and correspond to their positions.

Specifically, the image 41xF is associated with the front microphone 92F, the image 41xB is associated with the rear microphone 92B, the image 41xL is associated with the left microphone 92L, the image 41xR is associated with the right microphone 92R, and the image 41xI is associated with the internal microphone 92I.

In this embodiment, when an image associated with each microphone is selected in the icon image 41x, the sound data collected by the microphone and the selected image are output from the audio output device 43 and the waveform of the sound data is displayed in the display area 83. In this embodiment, the icon image 41x has a display mode of the selected image different from that of the unselected image.

In the example of FIG. 7, the display mode of the image 41xB is different from the display mode of the image 41xF, the image 41xL, the image 41xR, and the image 41xI, indicating that the image 41xB is selected.

In this embodiment, the selected image and the name of the corresponding microphone are displayed in the display area 83a. In the example of FIG. 7, the display area 83a displays the name "rear microphone" of the microphone associated with the image 41xB. The information displayed in the display area 83a is not limited to the name of the microphone.

The display area 83a may, for example, display the name of the member in the vicinity of the microphone corresponding to the selected image. In the example of FIG. 7, the display area 83a displays, in addition to the name of the microphone, information indicating that the rear microphone 92B is a microphone disposed near the engine.

In the operation information illustrated in the display area 82 of FIG. 7, the boom raising operation starts around "12:05" and when the operation input amount of the lever input (the boom lever input) is increased, the engine fuel injection pressure rises more than the predetermined operation (the arm lift, etc.) before the boom raising.

Further, in the environmental information indicated in the display area 83, as the engine fuel injection pressure increases, the amplitude of the waveform of the sound data increases, and the sound volume increases.

That is, the transmitted information displayed in FIG. 7 indicates that the load of the engine is increased when the boom lever is input for the predetermined operation such as "boom raising", and abnormal noise is generated near the engine.

As described above, according to the present exemplary embodiment, sound data during a predetermined operation and operation information can be displayed in association with each other. In other words, in this embodiment, the operation of the shovel PS at the time when an operator detects an abnormal noise can be displayed in association with the sound data.

Further, according to the present exemplary embodiment, by displaying the transmitted information collected in the above-described situation, investigation and verification can be performed including the load condition based on the status of the change in engine noise.

In this embodiment, for example, when an operator detects an abnormal noise during a predetermined operation, the transmitted information acquired during the predetermined operation can be output to reproduce the abnormal noise.

Accordingly, according to the present exemplary embodiment, the information concerning the noise during operation of the shovel can be shared between the service person and the operator without performing an on-site confirmation in which the service person visits the work site of the shovel PS and performs the predetermined operation again when an abnormal noise is detected.

Figure 8:
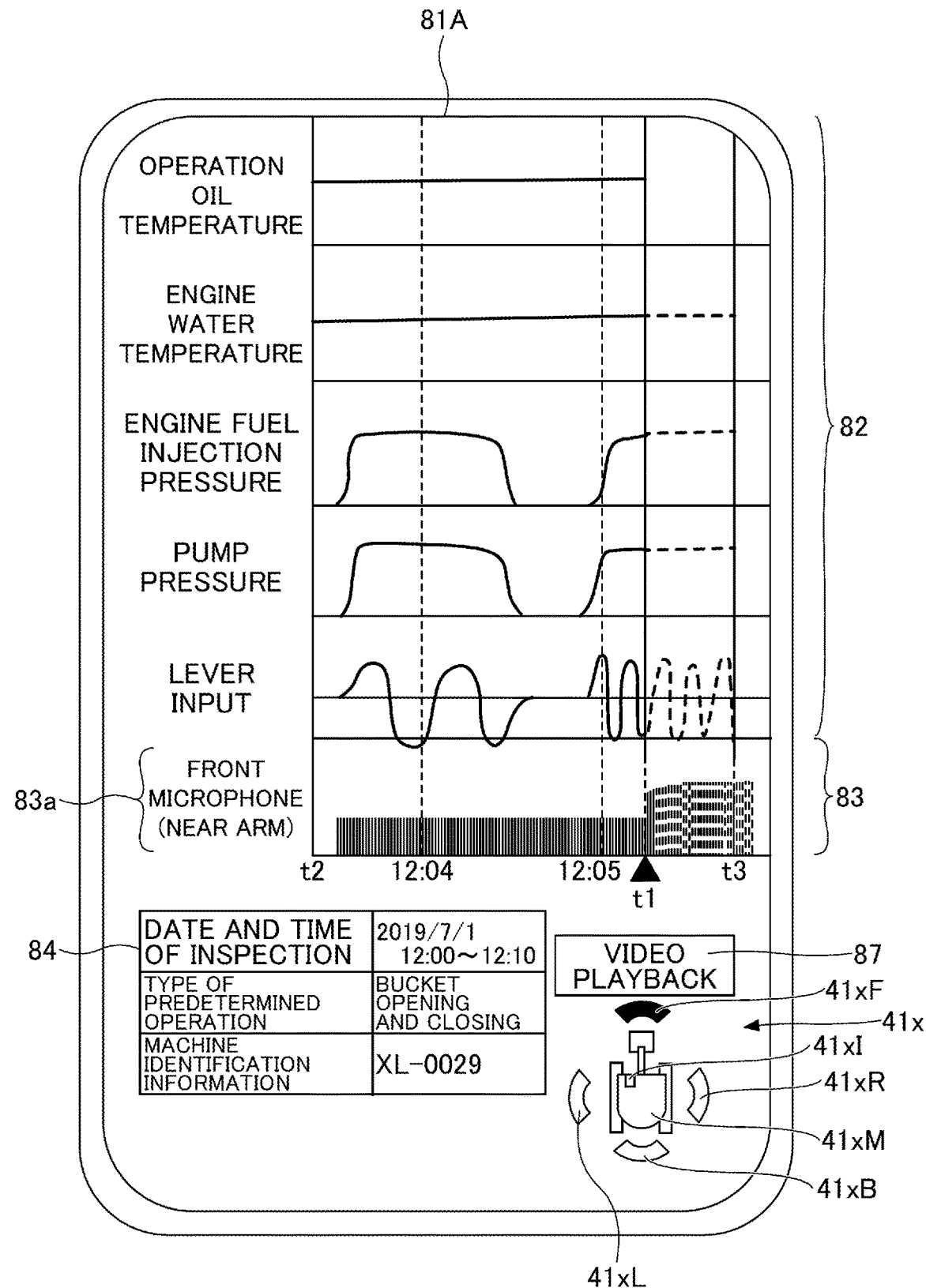
FIG. 8 is a second diagram illustrating a display example of the transmitted information.

FIG. 8 is a second diagram illustrating a display example of transmitted information. FIG. 8 illustrates an example of display of transmitted information when an abnormal sound is generated when the bucket 6 is opened and closed slowly and when the bucket 6 is opened and closed at high speed.

In the screen 81A illustrated in FIG. 8, an image 41xF is highlighted in the icon image 41x, and an image 41xF associated with the front microphone 92F is selected.

Accordingly, a waveform of the sound data collected by the front microphone 92F is displayed in the display area 83 and the sound data collected by the front microphone 92F is output from the audio output device 43.

In the example of FIG. 8, information such as "Front microphone" and "Near the arm" is displayed in the display area 83a.

In the operation information illustrated in the display area 82 in FIG. 8, the operation input amount of the lever input (bucket lever input) is relatively long period of variation until about "12:04", and the bucket 6 is slowly opened and closed until about "12:04". Further, in the operation information shown in the display area 82 of FIG. 8, the period of the operation input amount of the lever input (bucket lever input) is shorter than that of the past from around "12:05" and indicates that the bucket 6 is opened and closed at a high speed.

Further, in the environmental information illustrated in the display area 83 of FIG. 8, at time t1 after the bucket 6 is opened and closed at a high speed, the amplitude of the waveform of the sound data increases and the sound volume increases at time t1.

That is, in the transmitted information illustrated in FIG. 8, when the speed of the predetermined operation "Bucket opening/closing" is increased, abnormal noise is generated in the vicinity of the front microphone 92F.

In this embodiment, the wear condition around the bucket pin can be investigated from the transmitted information.

Further, in the screens illustrated in FIGS. 7 and 8, in the icon image 41x, the image associated with each microphone is selected, so that the display contents of the display area 82 in which the operation information is displayed are not changed, and only the display contents of the display area 83 and the display area 83a can be switched.

Specifically, for example, in FIG. 8, the image 41xF associated with the front microphone 92F is selected, and the image 41xL associated with the left microphone 92L is selected.

In this case, in the screen 81A, the display contents of the display areas 82 and 84 are not changed, but only the display contents of the display areas 83 and 83a are changed.

Specifically, the display area 83a displays the "Front microphone (near the arm)" as "Near the left microphone", and the display area 83 displays the waveform of the sound data collected by the left microphone 92L.

As described above, in this embodiment, audio data collected by the respective microphones can be displayed in association with the operation information.

Figure 9:
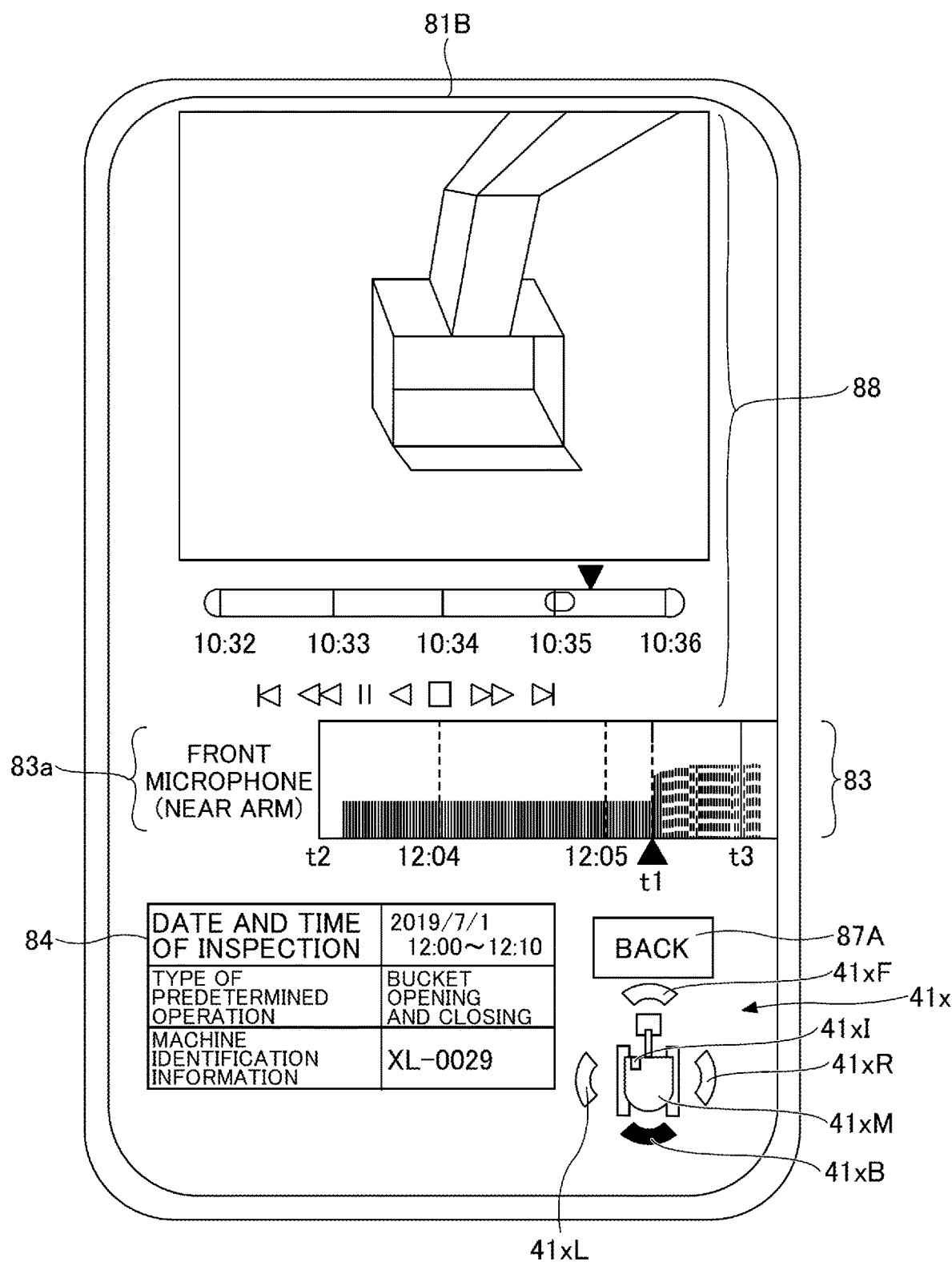
FIG. 9 is a diagram illustrating an example of a video playback screen.

Next, a display example when the operation button 87 is operated will be described with reference to FIG. 9. FIG. 9 is a diagram illustrating an example of a video playback screen. The screen 81B illustrated in FIG. 9 is a screen that transitions from the screen 81 when the operation button 87 is operated in the screen 81.

The screen 81B displays the display areas 83, 83a, 84, and 88, the operation button 87A, and the icon image 41x.

The display area 88 displays the video data captured by the imaging device 80. In the example of FIG. 9, the image 41xB is selected in the icon image 41x. Accordingly, the video data captured by the rear camera B disposed at a position corresponding to the image 41xB may be displayed in the display area 88.

Further, when an image other than the image 41xB is selected from the icon image 41x on the screen 81B, the video data displayed in the display area 88 and the waveform displayed in the display area 83 may be switched to be associated with the selected image.

Specifically, for example, the image 41xL is selected from the icon image 41x on the screen 81B. In this case, the display area 88 displays (playback) the video data captured by the left camera 80L and the display area 83 displays the waveform of the sound data collected by the left microphone 92L. In this case, the display area 83a may be indicated as "Left microphone", "Near the radiator fan", or the like.

The operation button 87A is an operation button for returning the screen 81B to the original screen. In this embodiment, when the operation button 87A is operated in the screen 81B, the screen 81B is moved to the screen 81 that was displayed immediately before.

As described above, according to the present exemplary embodiment, the video data and the sound data can be playback as the movie data corresponding to each other.

Figure 10:
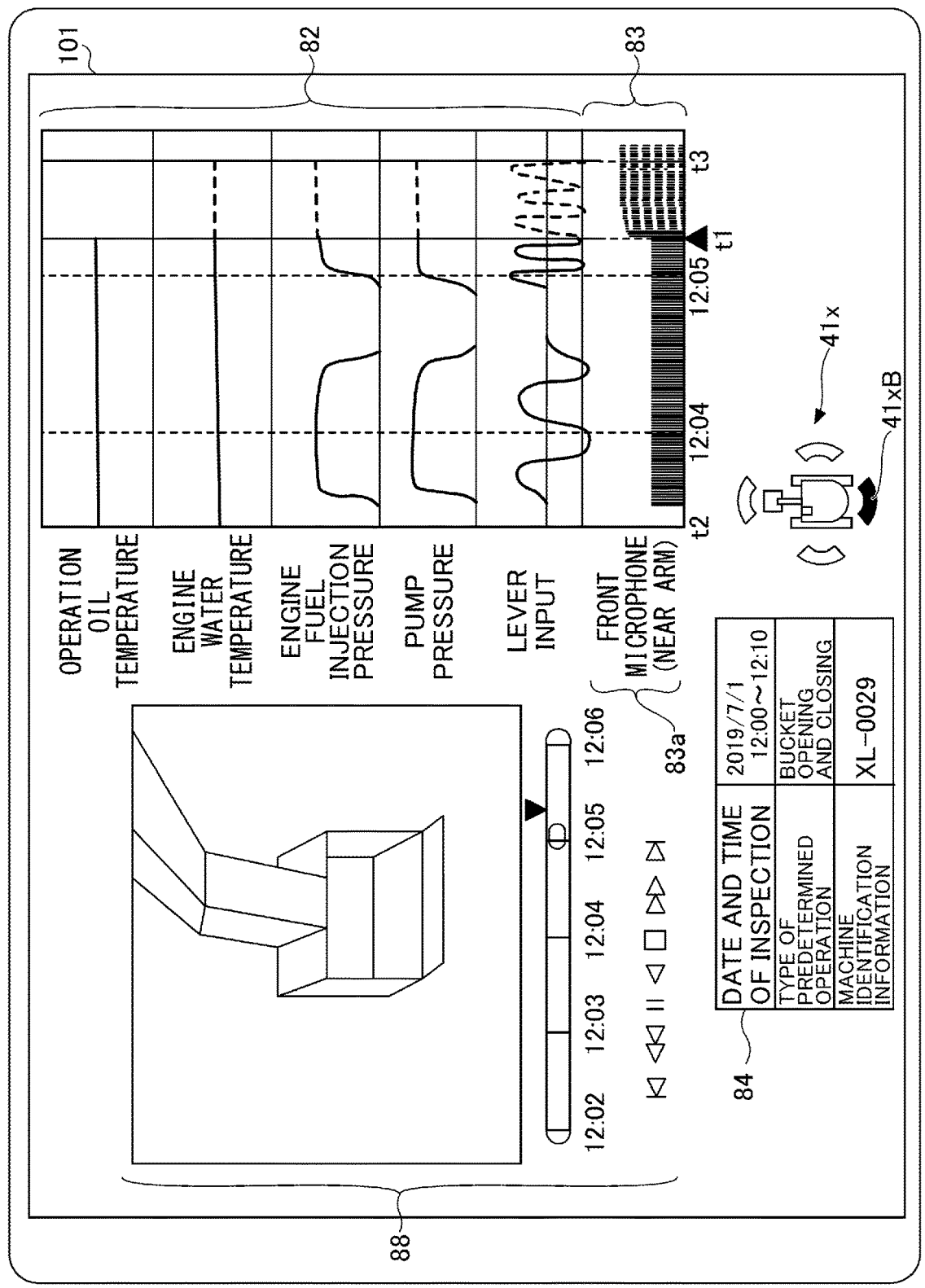
FIG. 10 is a diagram illustrating an example of a display when a video data and operation information are both displayed.

In this embodiment, the operation information and the video data may be displayed on the same screen. FIG. 10 is a diagram illustrating an example of a display when the video data and the operation information are both displayed. In the screen 101 shown in FIG. 10, the display areas 82, 83, 83a, 84, and 88 and the icon image 41x are displayed.

In the screen 101, in the icon image 41x, the image 41xB is selected. Therefore, the waveform of the sound data collected by the rear microphone 92B is displayed in the display area 83, the sound data is output from the audio output device 43, and the video data captured by the rear camera 80B is displayed in the display area 76.

In this manner, by displaying the video data along with the operation information, the sound during operation of the shovel PS, the detected value of the state detecting sensor, and the state of the shovel PS can be simultaneously displayed.

In the present embodiment, additional information other than the information obtained from the shovel PS may be added to the transmitted information and displayed.

Figure 11:
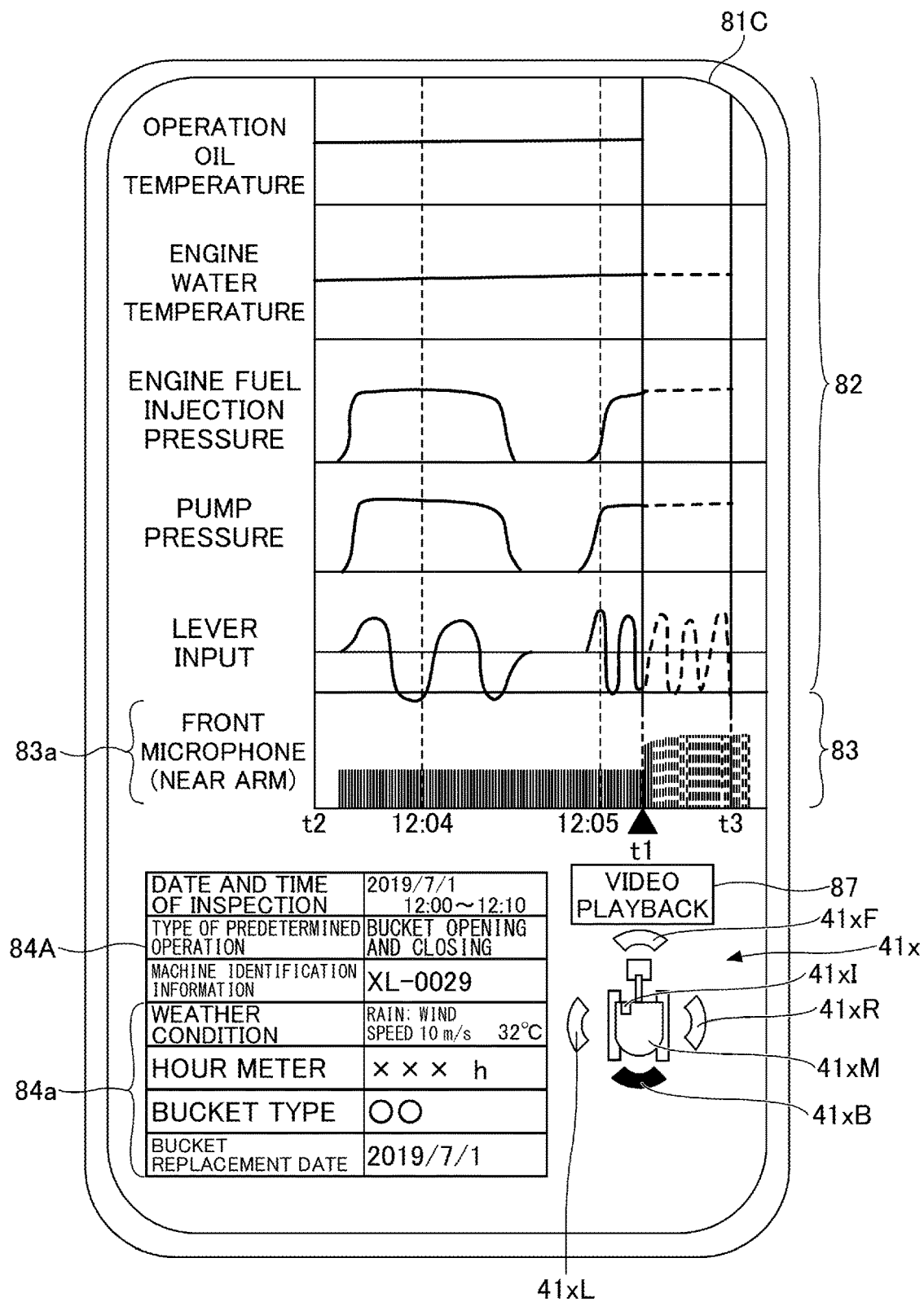
FIG. 11 is a diagram illustrating a display example of transmitted information to which additional information is applied.

FIG. 11 is a diagram illustrating a display example of transmitted information to which additional information is applied. In the screen 81C illustrated in FIG. 11, the display areas 82, 83, 83a, and 84A, the icon image 41x, and the operation button 87 are displayed.

In the display area 84A, the date and time when the shovel PS performed the predetermined operation, the information specifying the predetermined operation performed by the shovel PS, the information specifying the shovel PS, and the additional information 84a are displayed.

The additional information 84a according to this embodiment is information other than information obtained by the shovel PS. That is, the information of the detected values other than the state detecting sensor of the shovel PS is displayed in the screen 81C along with the transmitted information.

In FIG. 11, the additional information 84a is used as information including, for example, the weather conditions of the work site at the date and time when the predetermined operation is performed, the value of the hour meter, the type of bucket 6, and the date when the bucket 6 was exchanged.

In this embodiment, when the screen 81C is displayed on the display of the management device 90, the additional information 84a may be acquired from the Internet by the management device 90 and displayed along with the transmitted information.

For example, when the screen 81C is displayed on the display of the supporting device 200, the additional information 84a may be acquired by the supporting device 200 from the Internet and displayed along with the transmitted information.

Hereinafter, the processing of the supporting device 200 when the screen 81C is displayed on the display of the supporting device 200 will be described.

When, for example, the supporting device 200 receives the machine identification information of the shovel PS by the service person who is a user of the supporting device 200 and performs an operation to instruct the display of the transmitted information, the supporting device 200 notifies the management device 90 of a request for acquiring the transmitted information including the machine identification information of the shovel PS.

The management device 90 receives the notification and transmits the transmitted information including the machine identification information to the supporting device 200.

When the transmitted information is acquired, the supporting device 200 uses the inspection date and time included in the transmitted information as the search key, acquires the weather information of the inspection date and time from the Internet, and uses the additional information 84*a*. When position information indicating the position of the shovel PS is included in the transmitted information, the inspection date and time and the position information of the shovel PS may be used as a search key.

Information indicating the value of the hour meter, the type of bucket 6, and the date when the bucket 6 was exchanged may be included in the transmitted information.

In addition, the type of information used as the search key when acquiring the additional information 84*a* and the type of information acquired as the additional information 84*a* may be preset in advance in the supporting device 200.

In the present embodiment, the transmitted information and the additional information acquired by the item of the information included in the transmitted information as the search key are displayed together, so that the situation when the transmitted information is acquired can be transmitted to the service person in more detail. Of the items of information included in the transmitted information, the items displayed as part of the additional information are not limited to the items illustrated in FIG. 11, but may be optionally set.

In the screen 81C of FIG. 11, weather information is displayed as the additional information 84*a*. Accordingly, in this case, the additional information 84*a* is referred to when inferring whether abnormal noise during operation of the shovel PS is due to external factors such as rain or wind.

Further, in FIG. 11, the item of the information included in the transmitted information is acquired as the search key, but the additional information is not limited thereto. The additional information may be information indicating the state of the supporting device 200. Specifically, the additional information may be, for example, information representing the remaining battery capacity of the supporting device 200 or information representing the state of communication with the management device 90 or the shovel PS.

The additional information may be information that can be acquired by the supporting device 200 independently of the operation of the shovel PS.

The above-described display examples illustrated in FIGS. 7 to 11 may be displayed on the image display 41 of the display device 40 of the shovel PS, on the display of the management device 90, or on the display of the supporting device 200.

In the above-described embodiment, an example of acquiring a mechanical sound such as engine sound, attachment operation sound, and work site sound by using the sound collector 92 (microphone) provided with the shovel PS is illustrated. However, a mechanical sound such as engine sound, attachment operation sound, or the like of the shovel PS, or work site sound may be acquired by using a microphone provided with the supporting device 200.

Further, although the above-described embodiment illustrates an example in which a diagnosis is performed by the management device 90, when a predetermined algorithm is input to the supporting device 200, a diagnosis may be performed using the information regarding the sound acquired by the supporting device 200.

As described above, in this embodiment, the sound data from which the sound is collected during operation of the shovel PS is stored in association with the detected value of the shovel PS state detecting sensor.

Therefore, in the present embodiment, for example, when an operator detects an abnormal change due to the sound during operation of the shovel PS, it is possible for service personnel and others to understand what kind of operation the excavator PS was performing, thereby contributing to the improvement of the accuracy of the decision of the service person.

According to the present embodiment, the operation information and the environmental information are acquired while the shovel PS is performing the predetermined operation, but are not limited thereto. The operation information and environmental information may be acquired even when the shovel PS is performing operations other than the predetermined operations.

While the example embodiments of the invention have been described in detail above, the invention is not limited to the described embodiments, and various modifications and substitutions can be made to the embodiments without departing from the scope of the invention.

What is claimed is:

1. A shovel comprising:
a data acquisition device including at least one of:
an angle sensor configured to detect angle values related to at least one of a boom, an arm that is mounted to the boom, or a bucket that is mounted to the arm,
a body tilt sensor configured to detect tilt angles in two axial directions including a forward-rearward direction, and a left-right direction with respect to a horizontal plane of the shovel,
a turning angle sensor configured to detect a rotation angle of an upper traveling body, or
a traveling rotation sensor configured to detect a rotation speed of a traveling hydraulic motor; and
a storage,
wherein the data acquisition device acquires operation information indicating a detected value detected by the at least one of the angle sensor, the body tilt sensor, the turning angle sensor, or the traveling rotation sensor of the shovel during operation of the shovel; and sound data during operation of the shovel, from a state detecting sensor, and
wherein the storage stores the operation information in association with the sound data,
wherein the shovel further comprises:
an output device,
wherein the output device outputs the operation information along with the sound data, and
wherein the output device displays the operation information in association with a waveform indicated by the sound data on a display, and outputs the sound data from an audio output device, and
wherein the shovel further comprises:
a plurality of microphones that are provided at a plurality of positions on the shovel and collect the sound data during the operation of the shovel,
wherein the data acquisition device acquires the sound data from each microphone of the plurality of microphones,
wherein the output device displays a plurality of icon images on the display, the plurality of the icon images indicating the plurality of the positions on the shovel, each position being associated with a position of a corresponding microphone of the plurality of microphones on the display, wherein the output device displays a selected icon image that is selected by a user among the plurality of the icon images in a display mode that is different from unselected icon images, wherein a waveform of the sound data collected by the microphone corresponding to the selected icon image is displayed on the display, and the sound data collected by the corresponding microphone is output from the audio output device, and wherein the waveform of the sound data is displayed based on time and a volume of the sound data collected by the corresponding microphone.

2. The shovel according to claim 1, wherein the data acquisition device acquires the operation information during a predetermined operation and the sound data.

3. The shovel according to claim 1, further comprising:

an imaging device; and a human detector, wherein the human detector determines whether or not a person is present nearby the shovel based on surrounding image data captured by the imaging device, and wherein the operation is stopped when a presence of the person is detected.

4. The shovel according to claim 3, wherein the output device displays video data captured by the imaging device on the display along with the operating information.

5. A shovel management system comprising:

a shovel; and a management device of the shovel, wherein the shovel includes a data acquisition device including at least one of:

an angle sensor configured to detect angle values related to at least one of a boom, an arm that is mounted to the boom, or a bucket that is mounted to the arm, a body tilt sensor configured to detect tilt angles in two axial directions including a forward-rearward direction, and a left-right direction with respect to a horizontal plane of the shovel, a turning angle sensor configured to detect a rotation angle of an upper traveling body, or a traveling rotation sensor configured to detect a rotation speed of a traveling hydraulic motor, and the data acquisition device acquires operation information indicating a detected value detected by the at least one of the angle sensor, the body tilt sensor, the turning angle sensor, or the traveling rotation sensor of the shovel during operation of the shovel, and sound data during operation of the shovel, from a state detecting sensor, and wherein the management device includes a storage that stores the operation information received from the shovel in association with the sound data during the operation of the shovel, wherein the shovel further comprises:

an output device, wherein the output device outputs the operation information along with the sound data, and wherein the output device displays the operation information in association with a waveform indicated by the sound data on a display, and outputs the sound data from an audio output device, and wherein the shovel further comprises:

a plurality of microphones that are provided at a plurality of positions on the shovel and collect the sound data during the operation of the shovel, wherein the data acquisition device acquires the sound data from each microphone of the plurality of microphones, wherein the output device displays a plurality of icon images on the display, the plurality of the icon images indicating the plurality of the positions on the shovel, each position being associated with a position of a corresponding microphone of the plurality of microphones on the display, wherein the output device displays a selected icon image that is selected by a user among the plurality of the icon images in a display mode that is different from unselected icon images, wherein a waveform of the sound data collected by the microphone corresponding to the selected icon image is displayed on the display, and the sound data collected by the corresponding microphone is output from the audio output device, and wherein the waveform of the sound data is displayed based on time and a volume of the sound data collected by the corresponding microphone.

6. The shovel management system according to claim 5 further comprising, a supporting device, wherein the supporting device acquires the operation information and the sound data, and displays the operation information in association with a waveform indicated by the sound data on the display.

7. A shovel supporting device for a shovel including a data acquisition device including at least one of:

an angle sensor configured to detect angle values related to at least one of a boom, an arm that is mounted to the boom, or a bucket that is mounted to the arm, a body tilt sensor configured to detect tilt angles in two axial directions including a forward-rearward direction, and a left-right direction with respect to a horizontal plane of the shovel, a turning angle sensor configured to detect a rotation angle of an upper traveling body, or a traveling rotation sensor configured to detect a rotation speed of a traveling hydraulic motor, wherein the shovel supporting device receives operation information representing a detected value detected by the at least one of the angle sensor, the body tilt sensor, the turning angle sensor, or the traveling rotation sensor of the shovel during an operation of the shovel and sound data during the operation of the shovel, from a state detecting sensor of the shovel, and wherein the shovel supporting device displays the operation information in association with a waveform indicated by the sound data on a display, wherein the shovel further comprises:

an output device, wherein the output device outputs the operation information along with the sound data, and wherein the output device displays the operation information in association with a waveform indicated by the sound data on a display, and outputs the sound data from an audio output device, and wherein the shovel further comprises:
- a plurality of microphones that are provided at a plurality of positions on the shovel and collect the sound data during the operation of the shovel,
- wherein the data acquisition device acquires the sound data from each microphone of the plurality of microphones,
- wherein the output device displays a plurality of icon images on the display, the plurality of the icon images indicating the plurality of the positions on the shovel, each position being associated with a position of a corresponding microphone of the plurality of microphones on the display,
- wherein the output device displays a selected icon image that is selected by a user among the plurality of the icon images in a display mode that is different from unselected icon images,
- wherein a waveform of the sound data collected by the microphone corresponding to the selected icon image is displayed on the display, and the sound data collected by the corresponding microphone is output from the audio output device, and
- wherein the waveform of the sound data is displayed based on time and a volume of the sound data collected by the corresponding microphone.

8. The shovel supporting device according to claim 7,
wherein the shovel supporting device acquires additional information, and
wherein the shovel supporting device displays both the additional information and the operation information in association with the waveform indicated by the sound data on the display.

* * * * *